US011665278B2

(12) United States Patent
Tkaczyk et al.

(10) Patent No.: US 11,665,278 B2
(45) Date of Patent: May 30, 2023

(54) CONTEXTUAL CALL HANDLING MECHANISM WITH LEARNED RELATIONSHIP FILTER

(71) Applicant: INTERNATIONAL BUSINESS MACHINES CORPORATION, Armonk, NY (US)

(72) Inventors: Gregory M. J. H. Tkaczyk, Mississauga (CA); Eric Jeffery, Monument, CO (US); Shikhar Kwatra, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 17/197,072

(22) Filed: Mar. 10, 2021

(65) Prior Publication Data

US 2022/0294901 A1 Sep. 15, 2022

(51) Int. Cl.
*H04M 3/436* (2006.01)
*H04M 3/42* (2006.01)
*H04M 3/22* (2006.01)
*G06N 20/00* (2019.01)

(52) U.S. Cl.
CPC ............ *H04M 3/436* (2013.01); *G06N 20/00* (2019.01); *H04M 3/2281* (2013.01); *H04M 3/42068* (2013.01); *H04M 2203/551* (2013.01); *H04M 2203/556* (2013.01)

(58) Field of Classification Search
CPC combination set(s) only.
See application file for complete search history.

(56) References Cited

U.S. PATENT DOCUMENTS

| | | |
|---|---|---|
| 7,307,997 B2 | 12/2007 | Dmitri |
| 7,680,886 B1 | 3/2010 | Cooley |
| 7,877,084 B2 | 1/2011 | Martin |
| 7,894,589 B2 | 2/2011 | Bedingfield, Sr. |
| 8,913,994 B2 | 12/2014 | Edwards |
| 9,386,152 B2 | 7/2016 | Riahi |
| 9,647,978 B2 | 5/2017 | Kirchhoff |
| 10,182,148 B2 | 1/2019 | Winkler |
| 10,212,279 B1 | 2/2019 | Adinarayan |
| 10,367,945 B2 | 7/2019 | Bostick |
| 10,659,606 B2 | 5/2020 | Thomas |
| 10,764,433 B2 | 9/2020 | Collinson |

(Continued)

OTHER PUBLICATIONS

Azrour et al., "SPIT Detection in Telephony Over IP Using K-Means Algorithm," ScienceDirect, Procedia Computer Science, vol. 148 (2019), pp. 542-551.

(Continued)

*Primary Examiner* — Amal S Zenati
(74) *Attorney, Agent, or Firm* — Caleb D. Wilkes

(57) ABSTRACT

A method, computer system, and a computer program product for filtering a phone call are provided. An incoming phone call to a phone is detected. Call metadata from the incoming phone call is received. The call metadata is compared to entries of a learned relationship filter. The entries of the learned relationship filter are obtained by monitoring behavior of a phone user on the phone during previous calls to the phone and application usage on the phone so that learned relationships to the phone user are identified and saved. The learned relationship filter provides a filtering response. The filtering response is performed to the incoming phone call.

20 Claims, 19 Drawing Sheets

(56) References Cited

U.S. PATENT DOCUMENTS

| | | | |
|---|---|---|---|
| 2006/0240810 | A1 | 10/2006 | Chang |
| 2007/0071212 | A1 | 3/2007 | Quittek |
| 2008/0134285 | A1 | 6/2008 | Kim |
| 2008/0317229 | A1 | 12/2008 | Boss |
| 2009/0086953 | A1 | 4/2009 | Vendrow |
| 2010/0157853 | A1 | 6/2010 | Li |
| 2012/0128144 | A1 | 5/2012 | Chislett |
| 2012/0274725 | A1* | 11/2012 | Robertson ........... H04L 65/1069 348/E7.078 |
| 2014/0128047 | A1* | 5/2014 | Edwards ............... H04L 51/212 455/415 |
| 2016/0173436 | A1* | 6/2016 | Koolwal ................. H04L 51/52 709/206 |
| 2017/0134574 | A1* | 5/2017 | Winkler .............. H04L 63/0861 |
| 2019/0052752 | A1 | 2/2019 | Farrand |
| 2020/0322483 | A1 | 10/2020 | Anand |
| 2021/0160368 | A1* | 5/2021 | Liang ................. G06Q 30/0203 |

OTHER PUBLICATIONS

Edmonds, R., "7 Best Call Management Apps for Android Users," FTT, Jun. 19, 2012, [accessed Nov. 25, 2020], 10 pages. Retrieved from the Internet: <https://www.freshtechtips.com/2012/06/10-best-call-management-apps-for.html>.

Lee et al., "VoIP-aware network attack detection based on statistics and behavior of SIP traffic," Peer-to-Peer Netw. Appl. (2015), vol. 8, pp. 872-880, Published online: Jun. 12, 2014, DOI 10.1007/s12083-014-0289-8.

Li et al., "A Machine Learning Approach to Prevent Malicious Calls Over Telephony Networks," arXiv:1804.02566v1 [cs.CR] Apr. 7, 2018, 17 pages.

Liu et al., "Augmenting Telephone Spam Blacklists by Mining Large CDR Datasets," ASIACCS' 18, Jun. 4-8, 2018, Incheon, Republic of Korea, pp. 273-284.

Mell et al., "The NIST Definition of Cloud Computing", National Institute of Standards and Technology, Special Publication 800-145, Sep. 2011, 7 pages.

TrueCaller, "The world's best Caller ID & Spam Blocking app," [accessed Nov. 25, 2020], 3 pages, Retrieved from the Internet: <https://www.truecaller.com/>.

Xing et al., "Automated Fraudulent Phone Call Recognition Through Deep Learning," Hindawi, Wireless Communications and Mobile Computing, Published Aug. 28, 2020, vol. 2020, Article ID 8853468, 9 pages, https://doi.org/10.1155/2020/8853468.

* cited by examiner

| Call Register | | | | | | | | |
|---|---|---|---|---|---|---|---|---|
| ID | Date | StartTime | Inbound/ Outbound | Status | EndTime | Numeric CallerID | Alpha_CallerID | Number Dialed | Contact | Contact ID | ... |
| 1 | 20191103 | 9:04:54 | Inbound | Answered | 9:14:34 | 555-456-1234 | ALPHA DENTAL | | | | ... |
| 2 | 20191103 | 13:34:43 | Inbound | No Answer | 13:34:53 | 999-321-4321 | - | | | | ... |
| 3 | 20191103 | 14:34:54 | Inbound | No Answer | 14:35:04 | 999-321-5432 | - | | | | ... |
| 4 | 20191103 | 15:34:32 | Inbound | Suppressed | 15:34:36 | 999-321-6543 | - | | | | ... |
| 5 | 20191103 | 15:45:23 | Outbound | -- | 16:34:12 | -- | | 555-726-2837 | Alice Smith | 45 | ... |
| 6 | 20191103 | 16:54:22 | Outbound | -- | 16:56:45 | -- | | 555-456-1234 | - | -- | ... |
| ... | | | | | | | | | | | |

Allow Policy

| ID | Type | Filter | Numeric Caller ID | Alpha Caller ID | Days | Time Range | Response Action | Notes |
|---|---|---|---|---|---|---|---|---|
| 1 | Specified | ... | 888-222-11## | XYZ | * | * | Allow | Allow known subset of numbers |
| 2 | Contacts | Favorite=Yes | * | * | * | * | Allow | Allow Favorites |
| 3 | Contacts | Company=Acme | * | * | M, T, W, Th, F | 0800-1800 | Allow | Allow ACME during business hours |

FIG. 6

Block Policy

| ID | Type | Filter | Numeric Caller ID | Alpha Caller ID | Days | Time Range | Response Action | Notes |
|---|---|---|---|---|---|---|---|---|
| 1 | Specified | ... | 777-7777-#### | * | * | * | Block | Block known subset of numbers |
| 2 | Contacts | Name = "Sheila Murphy" | * | * | * | 21:00-08:00 | Block | Block contact evening |

FIG. 7

Call Metadata Policy

| ID | Filter | Numeric Caller ID | Alpha Caller ID | Days | Time Range | Response Action | Notes |
|---|---|---|---|---|---|---|---|
| 1 | NonCompliantUseOfCallerIDFields = true | * | * | * | * | Block | Block non-compliant use or spoofing of Caller ID fields |
| 2 | InternationalCall = true and Origin = (USA, Germany, England) | * | * | Sat, Sun | 09:00-21:00 | Allow | Allow certain international calls on weekends during daytime hours |
| 3 | InternationalCall = true and Origin = (USA, Germany, England) | * | * | Sat, Sun | 21:01-08:59 | AI Filter | Perform challenge/response after hours for international calls |
| 4 | InternationalCall = true | * | * | * | * | Voicemail | Send all international calls to voicemail otherwise |
| 5 | * | 555-543-#### | * | * | * | Voicemail | Always send these calls to voicemail |
| 6 | * | * | AIR DUCT | * | * | AI Filter | Perform challenge/response for air duct cleaning calls |

Manual Relationship Policy

| ID | Relationship Reference | Expiration | Days | Time Range | Response Action | Notes |
|---|---|---|---|---|---|---|
| ... | | | | | | |
| 8 | 24 | -- | * | * | Allow | Allow ACME Bank anytime |
| 9 | 25 | -- | M, T, W, Th, F | 09:00-17:00 | Voicemail | Send dental office to voicemail during business hours |
| ... | | | | | | ... |

Learned Relationship Policy

| ID | Relationship Reference | Expiration | Days | Time Range | Response Action | Notes |
|---|---|---|---|---|---|---|
| ... | ... | ... | ... | ... | ... | ... |
| 187 | 27 | 201911081159 | * | 09:00-21:00 | Allow | Allow steakhouse for 2 days after reservation ends |
| 188 | 28 | 201911121600 | * | 09:00-21:00 | Allow | Allow hotel for 5 days after reservation ends |
| 189 | 29 | * | * | * | Block | Block identified Robo dialer |
| ... | ... | ... | ... | ... | ... | ... |

External Data Source Policy

| ID | Relationship Reference | Expiration Days | Time Range | Response Action | Notes |
|---|---|---|---|---|---|
| ... | ... | ... | ... | ... | ... |
| 2 | 30 | -- | M, T, W, Th, F | 09:00-17:00 Allow | Allow callers identified in Enterprise Directory during business hours |
| 3 | 31 | -- | * | * Block | Block callers identified via Robo dialer intelligence provider |

CONTEXTUAL CALL HANDLING MECHANISM WITH LEARNED RELATIONSHIP FILTER

BACKGROUND

The present invention relates generally to the field of filtering telephone calls, and more particularly to using artificial intelligence to improve filtering for telephone calls.

SUMMARY

According to one exemplary embodiment, a method for filtering a phone call is provided. An incoming phone call to a phone is detected. Call metadata from the incoming phone call is received. The call metadata is compared to entries of a learned relationship filter. The entries of the learned relationship filter are obtained by monitoring behavior of a phone user on the phone during previous calls to the phone and application usage on the phone so that learned relationships to the phone user are identified and saved. The learned relationship filter provides a filtering response. The filtering response is performed to the incoming phone call. A computer system and computer program product corresponding to the above method are also disclosed herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3 shows an example of a call register for use in the filtering process according to at least one embodiment;

FIG. 6 shows an example of an allow policy for use in the static filter and in the filtering processes of FIGS. 5 and 2 according to at least one embodiment;

FIG. 7 shows an example of a block policy for use in the static filter and in the filtering processes of FIGS. 5 and 2 according to at least one embodiment;

FIG. 8 shows an example of a call metadata policy for use in the static filter and in the filtering processes of FIGS. 5 and 2 according to at least one embodiment;

FIG. 10 shows an example of a manually defined relationship policy for use in the manually defined relationship filter and in the filtering processes of FIGS. 9 and 2 according to at least one embodiment;

FIG. 12 shows an example of a learned relationship policy for use in the learned relationship filter and in the filtering processes of FIGS. 11 and 2 according to at least one embodiment;

FIG. 14 shows an example of an external source data policy for use in the external source filter and in the filtering processes of FIGS. 13 and 2 according to at least one embodiment;

DETAILED DESCRIPTION

Figure 1:
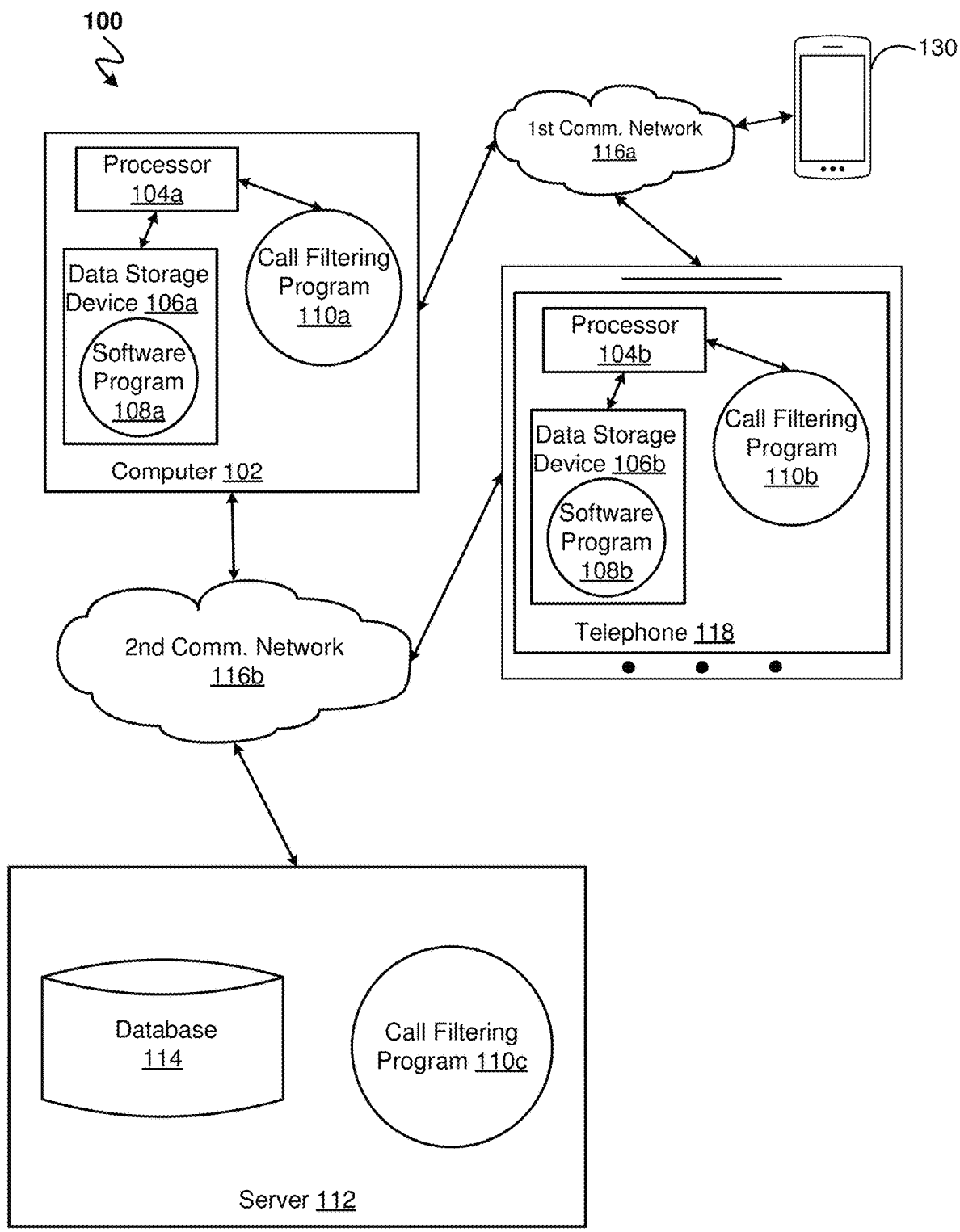
FIG. 1 illustrates a networked computer and telephone environment according to at least one embodiment.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method, and computer program product for filtering telephone calls using a learned relationship filter that is developed by monitoring and interpreting previous phone usage of the phone. The present embodiments have the capacity to improve the technical field of filtering phone calls so as to increase accuracy of the phone filter in blocking unwanted calls and in allowing desired calls. The present embodiments have the capacity to improve privacy for users and to reduce the volume of phone fraud and social engineering which are rampant in modern communications. The present embodiments may reduce incoming interruptions and enable individuals and workers to continue work or recreation without needing to stop to unnecessarily review an incoming phone call. The present embodiments may use machine learning to establish and dynamically adjust a relationship corpus, a learned relationship policy, and call filtering based on evolving relationships and user behavior. The present embodiment allows for customization of permitted telephone calls based on the behavior and preferences of a specific user. The present embodiments may allow the phone to more correctly respond to a call by allowing, blocking, directing to voicemail, answering with a challenge question, or sending the call to an artificial intelligence filter for interactive triage based on the desires of the user as automatically recognized by the call filtering program on the phone. The present embodiments may be added to device management tools for software and cloud systems that manage bring-your-own-device and enterprise-issued device connections to company data and software infrastructure.

The present embodiments may implement automated learning of entity relationships and duration based upon user behavior on the phone, monitoring application usage and web browsing, and proposals of policy updates. For example, a restaurant reservation made through an electronic service for making a restaurant reservation, such as OpenTable® (OpenTable and all OpenTable-based trademarks and logos are trademarks or registered trademarks of OpenTable, Inc. and/or its affiliates), a hotel reservation made through an app or website of the hotel, and ongoing calls from a range of numbers, etc. may be analyzed to identify entity relationships to be considered for the call filtering of the present embodiments. The present embodiments may include automated and ongoing updates to a relationship corpus for manually defined relationships, learned relationships, and external data sources. For example, if a consumer's credit card company changes outbound numbers, then the relationship corpus can be adjusted to save this new outbound number for subsequent usage in the call filtering process. The present embodiments provide a filtering policy model that considers active relationships, the time of a current call and past calls, and various responses. For example, the filter response may vary based on the day of the week, the time of call, etc.

Application usage as used in the present disclosure may refer to app usage. An app may be a specialized program that is downloadable onto a mobile device. An app may be accessed via the internet or stored locally and can use native features of a mobile device. An app may need to be downloaded to a mobile device and may be able to provide push messages to the mobile device. Application usage as used in the present disclosure may also refer to desktop, laptop, or table computer applications such as web browsers, email clients, chat clients, etc.

Non-limiting examples of monitoring application usage according to the present disclosure are:

what applications the phone user is using;

whether the phone user has an account or has authenticated with the application (having an account may be an indicator of a relationship with the app's owner);

what types of transactions the user performs, e.g., making a reservation, booking an appointment, chatting, submitting an insurance claim, looking up account information, contacting customer support, etc.;

identification of the potential time/duration of a relationship resulting from the transaction (e.g., the date/time of a reservation);

how often the user uses the application (frequency may indicate the strength of the relationship or need for prioritization);

identification of specific web applications or APIs that are accessed by desktop applications, e.g., a bank website or API; and identification of specific communication recipients contacted by communications applications such as chat or email apps, desktop chat or email applications, or communications web applications, e.g., the social platform username of a bank support desk, email address of the bank account manager, etc.

For example, a relationship with a bank may be identified if (1) the user has authenticated to and is using the app of the bank on their mobile phone, (2) the user uses a web browser to access and authenticate to the website of the bank, or (3) the user uses a chat or social media platform to contact a support desk of the bank either from the mobile phone or from a desktop computer, etc.

Data retrieval on the phone may refer, in the present disclosure, to application usage or to web browsing. On a desktop computer acting as a phone, the user may use websites exclusively for data retrieval instead of any app. For a mobile device, a user may use apps exclusively for data retrieval, may use website browsing exclusively for data retrieval, or may use a combination of app usage and website browsing for data retrieval. Data retrieval that is monitored as described in this present disclosure may refer to data retrieval such as app usage or web browsing that occurs prior to the incoming phone call that triggers the phone call filtering.

The automated learning may be performed via a machine learning model on the device or in the cloud. Observations from monitoring the device usage may be inputs into the machine learning model. A potential relationship and filter response for the relationship may be outputs of the machine learning model. Using a machine learning model on the device helps reduce data transmission required between the device and a server in the cloud. Such mobile machine learning model may be performed using inference-based machine learning models such as TensorFlow® Lite (TensorFlow® and all TensorFlow®-based trademarks and logos are trademarks or registered trademarks of Google, Inc. and/or its affiliates). Besides monitoring app usage and web browsing on the phone, etc., monitoring phone user behavior on the phone may include monitoring interactions of the phone user and the phone during previous calls to the phone. For example, this behavior may be direct interactions (accept a call, talk a long time, quickly hang up, decline call, send "can't talk right now" text response, interrupt another call to take this one, etc.) between the phone user and the phone during previous calls and/or may be lack of interaction between the phone user and the phone (always ignore a call, ignore the call during certain times, etc.) during previous calls.

Call metadata that is transmitted with the call may include a name, a phone number of the device that makes the call, and other information. This call metadata may be received by the device, e.g., the phone, that is receiving the incoming call. The received metadata may be used for comparison purposes to perform call filtering. For several decades, phone service providers have provided a caller identification (caller ID) with each phone call sent to a phone. This caller ID allows the recipient of the phone call to see who is making the call. Although several standards exist for providing caller ID, typically the caller ID includes a numeric identification (numeric ID) and an alphanumeric identification (alpha ID). The numeric identification is typically the phone number of the person or entity making the phone call to the recipient. The alphanumeric identification is typically the name or other description of the person or entity making the phone call to the recipient. The recipient can then decide whether to answer the phone call or not based on the caller ID. In addition, the recipient may program his phone to filter phone calls (i.e., block or allow) for caller IDs from unwanted callers.

For phone calls that encompass video as well as audio and/or for phone calls received by a computer, this metadata may include other identifiable information such as an email address, a unique username or identifier, etc.

A phone as described herein may refer to a mobile phone or a landline phone or to a computer that is capable of receiving calls. Such computers may include, as examples, a personal digital assistant, a netbook, a laptop computer, a tablet computer, a desktop computer. FIG. 1 below refers separately to a computer and a telephone; however, for the purpose of this disclosure a phone may encompass both a mobile phone device and a computer that can make and accept calls.

A phone call as described herein may refer to a call with voice and no video transmissions, with voice and video transmission, or with video and no voice transmissions. Other types of sense transmissions may be added as well to the voice and/or video transmission of the phone calls as described herein.

Referring to FIG. 1, an exemplary networked computer and telephone environment 100 in accordance with one embodiment is depicted. The networked computer and telephone environment 100 may include a computer 102 with a first processor 104a and a first data storage device 106a that is enabled to run a first software program 108a and a call filtering program 110a. The networked computer and telephone environment 100 may also include a telephone 118 that includes many of the same internal components as the computer 102, including a second processor 104b and a second data storage device 106b that is enabled to run a second software program 108b and a call filtering program 110b. The networked computer and telephone environment 100 may also include a server 112 that is a computer and that is enabled to run a call filtering program 110c that may interact with a database 114 and a second communication network 116b. The networked computer and telephone environment 100 may include a plurality of computers 102, telephones 118, and servers 112, although only one computer 102 and one server 112 are shown in FIG. 1. This disclosure may refer to the computer 102 or the telephone 118 in various instances, as either device may be used to receive a telephone call.

Figure 15:
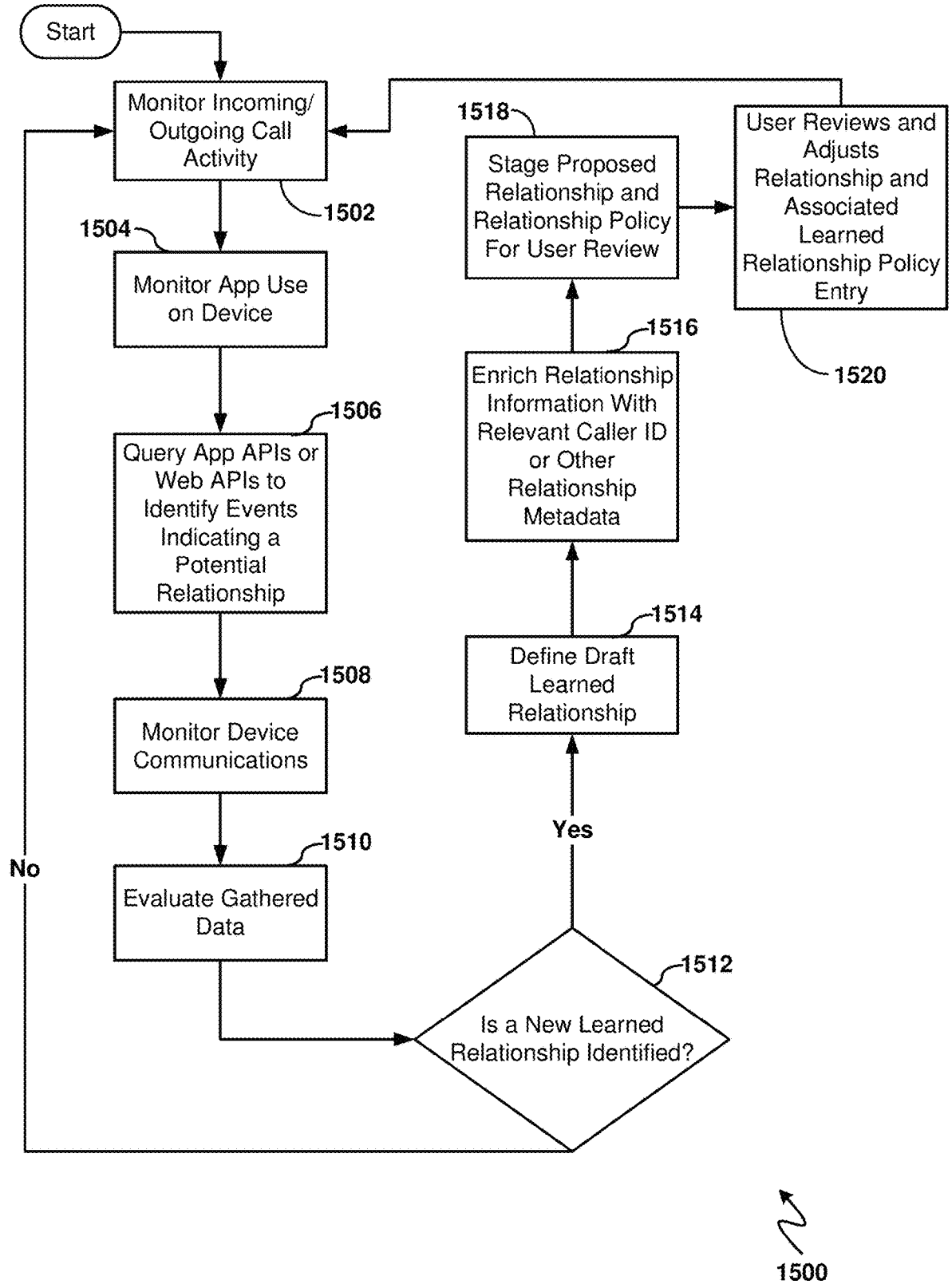
FIG. 15 is an operational flowchart illustrating generation of learned relationship entries for use in the processes shown in FIG. 11 and in FIG. 2 for telephone call filtering according to at least one embodiment.
Figure 16:
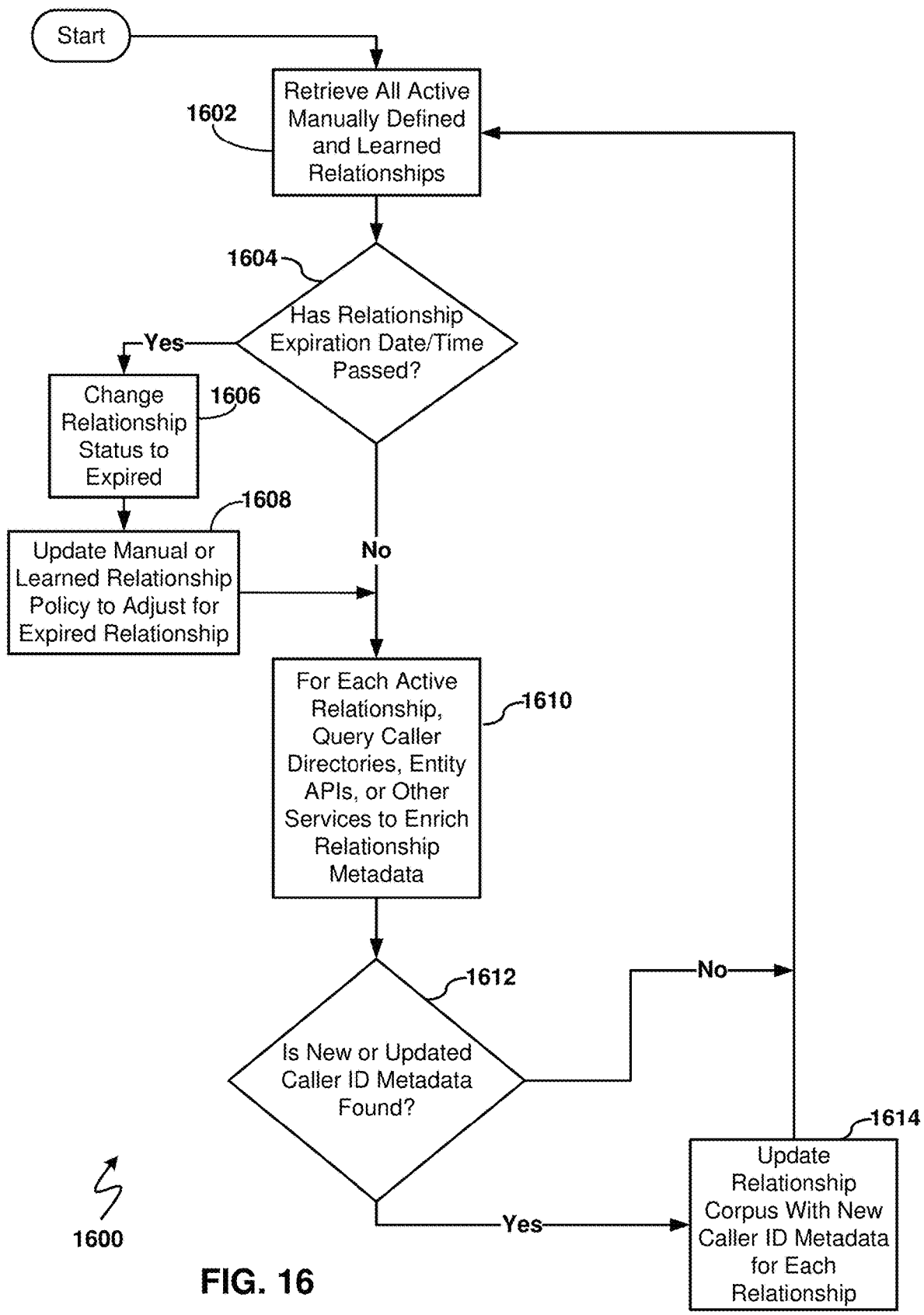
FIG. 16 is an operational flowchart illustrating updating of manually defined and learned relationship entries for use in the processes shown in FIGS. 9 and 11 and in FIG. 2 for telephone call filtering according to at least one embodiment.
Figure 17:
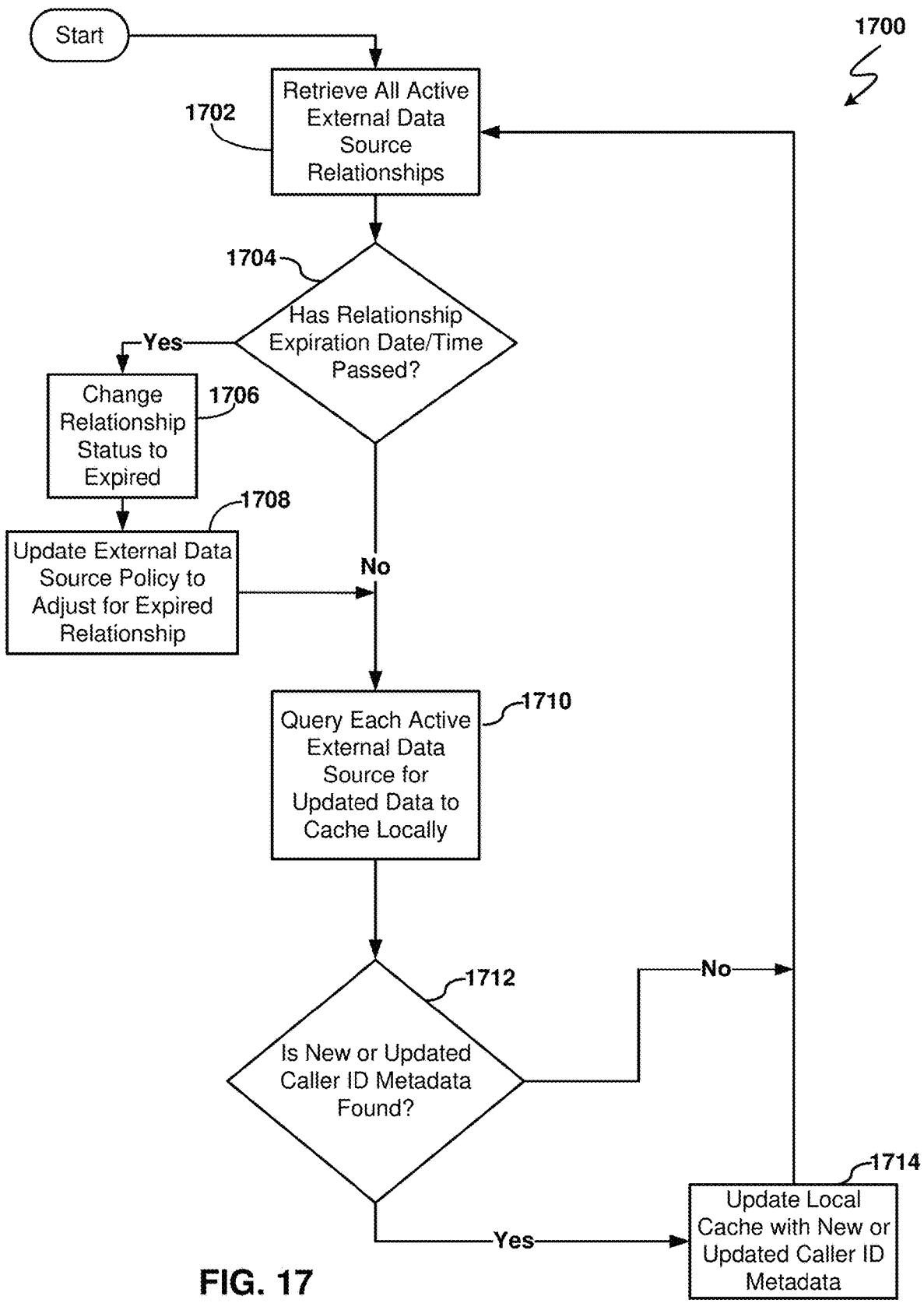
FIG. 17 is an operational flowchart illustrating updating of external source relationship entries for use in the processes shown in FIG. 13 and in FIG. 2 for telephone call filtering according to at least one embodiment.

The call filtering program 110a, 110b, 110c may include a monitoring and update module. FIGS. 15-17 describe features and steps performed by the monitoring and update module. The monitoring and update module may continuously make updates to a relationship corpus of the call filtering program 110a, 110b, 110c and related policy definitions. The analysis of user behavior may include ingesting information from a call register for a mobile device as well as via app activity, e.g., what apps are being used, on the mobile device. Specific events carried out via the applications (apps) such as making a hotel reservation or a restaurant reservation may indicate the creation of a new relationship for the user. Analysis of communications such as through email, messaging, and social media may also identify new relationships. The monitoring and update module may monitor app usage on the computer 102 or on the telephone 118 to perform the call filtering process.

Various apps such as hotel reservations apps, banking apps, restaurant reservation apps, insurance apps, email apps, travel apps, ride-share apps, messaging apps, social media apps, corporate mobile device management (MDM) apps, and others may be stored on the computer 102 or on the telephone 118 and may be accessed and used by the device user. A device user's usage of these apps may be monitored by the monitoring and update module. The monitoring and update module may also monitor a device user's usage of a web browser on the computer 102 or on the telephone 118 to analyze websites visited by a user and to identify new relationships or updated relationship information for a user that may lead to future phone calls. The call filtering program 110a, 110b, 110c may provide advance notice to the user of its phone usage and call monitoring features and may obtain consent from the user to participate in this monitoring. Such consent may be obtained through generating and displaying a graphical user interface (GUI) on the computer or phone display which allows the user to enter an acceptance.

The monitoring and update module may also communicate with an external data source to obtain external data source integrations. Such integrations may include updates and may occur periodically or based on a specific event. Such integrations may cause an update to a relationship corpus stored by the call filtering program 110a, 110b, 110c. Such external data source integrations may be from caller directory services, an enterprise directory, from an app/entity API, from mobile device management, from categorization services, from caller ID verification services, and from a mobile plan provider that provides cellular service for a cell phone.

Figure 4:
FIG. 4 shows an example of a relationship corpus that may be made and used in the filtering process according to at least one embodiment.

The monitoring and update module may feed information regarding entry updates to individual filters, e.g., to the static filter and its allow policy, block policy, and call metadata policy, to the manually defined relationship filter and its manually defined relationship policy, to the learned relationship filter and its learned relationship policy, and the external data source filter and its external data source policy. A call register, an example of which is shown in FIG. 3, may provide information and data to the monitoring and update module. The call register may be a list of calls previously made to the telephone 118 or to the computer 102. The list may include a call outcome for each call, such as call answered or actively suppressed and may include a time and date of the call etc. The call register or registry may be used for understanding user behavior for a certain caller and for certain types of calls. The monitoring and update module may feed information regarding entry updates to the relationship corpus. An example of the relationship corpus is shown in FIG. 4.

The monitoring and update module may assess the monitored device usage information and may enrich this information with additional information obtained via queries to application programing interfaces or APIs. The monitoring and update module may propose updates to the relationship corpus and to learned relationship policies. These proposed updates may require user review and approval or may be automatically implemented.

The monitoring and update module may also continuously check for updates to existing manual relationship policies or learned relationship policies. This includes checking whether the expiration of the relationship has been reached and updating the relationship corpus and related polices. Further, the monitoring and update module may query each manual or learned relationship data source such as caller directory services, entity APIs, and categorization services in order to determine if any updates are required for the relationship. For example, if the telephone number and/or caller ID metadata of an office has changed, the monitoring and update module may learn this information, e.g. via a website search, and may update this information in the policy of the call filtering program 110a, 110b, 110c.

The monitoring and update module may also continuously check for updates for data to be locally cached from external data sources. Relationships can be established with external data sources such as enterprise directories, mobile device management systems, caller categorization services, caller ID verification services, mobile plan providers, and the like. As an example, a user may wish to create a policy to allow inbound calls from other employees of their enterprise during business hours. In this case, the implementation may locally cache the caller ID metadata for those employees within the users organization within the relationship corpus. Therefore, during a call, the decision making module can check the locally cached information first, and then subsequently query the defined enterprise directory external data source if the caller does not match with information found in the locally cached data.

The call filtering program 110a, 110b, 110c may access a call register as is shown in FIG. 3. The call filtering program 110a, 110b, 110c may include a decision making module which incorporates one or more of the static filter, examples of which are described in FIGS. 5-8, the manually defined relationship filter, examples of which are described in FIGS. 9-10, the learned relationship filter, examples of which are described in FIGS. 11-12, and the external source filter, examples of which are described in FIGS. 13-14. The decision making module may also receive updates and ingest data from the call register, from the relationship corpus, and from the individual filters, namely the static filter, the manually defined relationship filter, the learned relationship filter, and the external data source filter. Both the call register and the relationship corpus may be saved in a data memory of the telephone 118 or the computer 102, e.g., in the first data storage device 106a or in the second data storage device 106b, respectively, or in the cloud, e.g., in the database 114 of the server 112. The decision making module may query external data sources in real time for present decision making and based upon active external data source relationships. Such external data sources may include an enterprise directory, a caller ID verification service/categorization service, a mobile plan provider, and mobile device management programs.

The decision making module may be activated to determine how to handle an incoming call and may update and feed its decisions to a response register of the call filtering program 110a, 110b, 110c. The response register may communicate to a response execution module of the call filtering program 110a, 110b, 110c. The decision making module may execute logic presented in FIGS. 2, 5, 9, 11, and 13.

The response execution module may execute the response of the call filtering program 110a, 110b, 110c based on the decision of the decision making module. For example, the response execution module may allow or deny a call to be received by the telephone 118 or by the computer 102. A received call may be received via a cellular network if the telephone 118 or computer 102 are mobile devices or may be received via a landline connection if the telephone 118 or computer 102 are connected to a land telephone line. The call register may then be updated according to the decision made or the execution performed. If the call was accepted, the call register may be updated to record a length of the call.

Portions of the call filtering program 110a, 110b, 110c may in other embodiments be implemented in cloud service and replicated to the telephone 118 or to the computer 102. Such replication would allow some updates and data enrichment processing to occur off of a mobile device. For example, one or more of the monitoring and update module, the relationship corpus, the call register, the decision making module, the individual filters and their policies, the response register, and the response execution module may be implemented in the cloud, e.g., in the server 112 which then in real-time communicates appropriate instructions and information to the telephone 118 or to the computer 102 for responding to and filtering an incoming or inbound phone call. The modules may include one or more executable instructions for implementing the specified logical function(s) in a software program.

Another phone device 130 is shown in FIG. 1 which may place a telephone call to the telephone 118 or to the computer 102. Such telephone call may be an incoming or inbound telephone call from the perspective of the telephone 118 or of the computer 102. The other phone device 130 may be a mobile phone that calls via a cellular network, may be a phone connected to a landline that makes the call in part or completely via a POTS (plain old telephone service) analog voice transmission phone system implemented over copper twisted pair wires, or may be a robo-dialer that is part of a computer system that generates outgoing robocalls. The other phone device 130 may generate a telephone call that includes call metadata that is transmitted along with the phone call and that is received by the telephone 118 or by the computer 102. The call metadata and a timestamp for the incoming call may be recorded in the call register.

The first communication network 116a allowing a phone call and communication between the other phone device 130 and the telephone 118 or the computer 102 may include various types of communication networks, such as the Internet, a wide area network (WAN), a local area network (LAN), a telecommunication network, a wireless network, a public switched telephone network (PTSN) and/or a satellite network. The second communication network 116b allowing communication between the server 112 and the computer 102 or the telephone 118 may also include various types of communication networks, such as the Internet, a wide area network (WAN), a local area network (LAN), a telecommunication network, a wireless network, a public switched telephone network (PTSN) and/or a satellite network. The second communication network 116b may be the same as or different from the first communication network 116a. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server 112 via the second communications network 116b. The second communications network 116b may include connections, such as wire, wireless communication links, or fiber optic cables. As will be discussed with reference to FIG. 18, server 112 may include internal components 1802a and external components 1804a, respectively, and client computer 102 or telephone 118 may include internal components 1802b and external components 1804b, respectively. Server 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 and telephone 118 may be, for example, a mobile device, a telephone, a personal digital assistant, a netbook, a laptop computer, a tablet computer, a desktop computer, or any type of computing devices capable of running a program, accessing a network, and accessing a database 114 in a server 112 that is remotely located with respect to the client computer 102 and to the telephone 118. According to various implementations of the present embodiment, the call filtering program 110a, 110b, 110c may interact with a database 114 that may be embedded in various storage devices, such as, but not limited to a computer/mobile device 102, a telephone 118, a networked server 112, or a cloud storage service.

According to the present embodiment, a user using a client computer 102 or telephone 118 may use the call filtering program 110a, 110b, 1110c to filter unwanted incoming phone calls more accurately and to more accurately avoid blocking of phone calls that the user would like to receive. The call filtering process 200 is explained in more detail below with respect to FIGS. 2-17.

Figure 2:
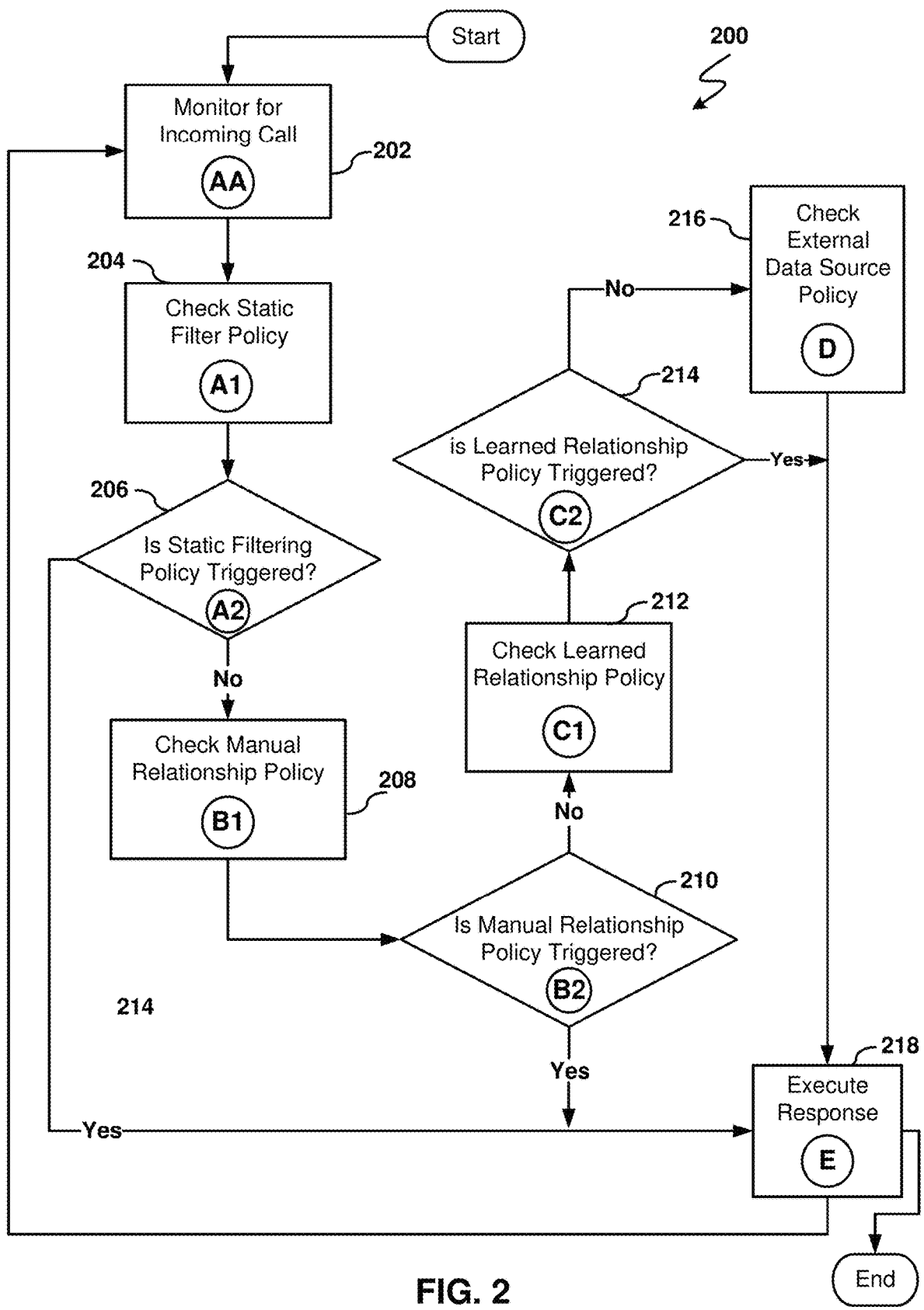
FIG. 2 is an operational flowchart illustrating a filtering process for telephone call filtering according to at least one embodiment.

Referring now to FIG. 2, an operational flowchart depicts a call filtering process 200 that may, according to at least one embodiment, be performed by the call filtering program 110a, 110b.

In a step 202 of the call filtering process 200, an incoming call to a phone is monitored. The call filtering program 110b installed on the telephone 118 may perform this monitoring when the telephone 118 receives an incoming phone call, e.g., from the other phone device 130. Similarly, the call filtering program 110a installed on the computer 102 may perform this monitoring when the computer 102 receives an incoming phone call, e.g., from the other phone device 130. This step 202 may include the detecting of an incoming phone call to the telephone 118 or to the computer 102.

In a step 204 of the call filtering process 200, a static filter policy is checked. This checking of step 204 is described more in detail with the static filter process 500 shown in FIG. 5, the allow policy shown in FIG. 6, the block policy shown in FIG. 7, and the call metadata policy shown in FIG. 8. The static filter process 500 may implement a static filter to the incoming phone call. The static filter policy may be local to the device, e.g., to the telephone 118 or to the computer 102. The allow policy may include a manually defined allowed list of numbers, all device contacts, a subset of device contacts that meet some criteria, e.g., favorites, tags, groups, etc., and a time range. The time range may be coded to some or all entries in the static filter policy and may indicate at which times or days the call from that party should be passed through to the telephone 118. For example, a time range code could be all times for some or all entries and certain dates or certain days of the week or hours for other parties or entries.

In a step 206 of the call filtering process 200, a determination is made as to whether the static filtering policy is triggered. This determination of step 206 is described more in detail with the static filter process 500 shown in FIG. 5, the allow policy shown in FIG. 6, the block policy shown in FIG. 7, and the call metadata policy shown in FIG. 8. The triggering of the static filtering policy may result in the call filtering process 200 proceeding directly to the step 218 to execute a specific response as outlined in the static filtering policy, e.g., of denying or allowing the call. A non-triggering of the static filtering policy may result in the call filtering process 200 proceeding next to the step 208.

In a step 208 of the call filtering process 200, a manually defined relationship policy is checked. This checking of step 208 is described more in detail with the manually defined relationship filter process 900 shown in FIG. 9 and the manually defined relationship policy shown in FIG. 10. The manually defined relationship filter process 500 may implement a manually defined relationship filter to the incoming phone call. The manually defined relationship policy may include a list of entities or people having a known relationship to the user of the telephone 118 or the computer 102 and with whom the user has exchanged a phone call. The user may also have manually updated contact information, e.g., a phone number, of a person into the manual relationship list with whom the user has not yet had a telephone call. The manually defined relationship policy may include entries for a bank used by the device user, a dentist of the device user, an insurance company or agent of the device user, a credit card used by the device user, etc. The manually defined relationship policy may include acceptable time ranges for receiving calls from the various entries or people in this policy, for example, on certain dates, days of the week, hours of the day, etc. The manually defined relationship policy may access the relationship corpus, an example of which is shown in FIG. 4.

In a step 210 of the call filtering process 200, a determination is made as to whether the manually defined relationship policy is triggered. This determination of step 210 is described more in detail with the manually defined relationship filter process 900 shown in FIG. 9 and the manually defined relationship policy shown in FIG. 10. The triggering of the manually defined relationship filtering policy may result in the call filtering process 200 proceeding directly to the step 218 to execute a specific response designated in the manually defined relationship policy for the call, e.g., of allowing or denying the call. A non-triggering of the static filtering policy may result in the call filtering process 200 proceeding next to the step 212.

In a step 212 of the call filtering process 200, a learned relationship policy is checked. This checking of step 212 is described more in detail with the learned relationship filter process 1100 shown in FIG. 11 and the learned relationship policy shown in FIG. 11. The learned relationship filter process 1100 may implement a learned relationship filter to the incoming phone call. The learned relationship filter process 1100 may access the relationship corpus 402 that is shown in FIG. 4. The learned relationship policy may include a list that is continuously updated based on user behavior such as ignoring an incoming phone call, hanging up on a received phone call, and usage of apps or web browsing on the user device. The apps may include those for making restaurant reservations, hotel reservations, airline reservations, messaging, or email.

In a step 214 of the call filtering process 200, a determination is made as to whether the learned relationship policy is triggered. This determination of step 214 is described more in detail with the learned relationship filter process 1100 shown in FIG. 11 and the learned relationship policy shown in FIG. 12. The triggering of the learned relationship filtering policy may result in the call filtering process 200 proceeding directly to the step 218 to execute a specific response designated in the learned relationship policy for the call, e.g., of allowing or denying the call. A non-triggering of the learned relationship filtering policy may result in the call filtering process 200 proceeding next to the step 216.

In a step 216 of the call filtering process 200, an external data source policy is checked. This checking of step 216 is described more in detail with the external data source filter process 1300 shown in FIG. 13 and the external data source policy shown in FIG. 14. The external data source filter process 1300 may implement an external data source filter to the incoming phone call. The external data source policy may relate to integrations to support third party services. This policy may relate to third party entity relationships such as integration with an Enterprise Directory for a company, cell plan providers, mobile device management platforms, caller category engines, and malicious caller list providers. This policy may also include time categories for the various policy entries in order to indicate acceptable times, dates, or days of week to accept calls from certain callers.

If the external data source filter is triggered, the call filtering process 200 may proceed to the step 218 to execute a specific response designated in the external data source policy for the call, e.g., of allowing or denying the call. As step 216 may be the last step before step 218 in the call filtering process 200, a non-triggering of the external data source filter may result in the call filtering process 200 proceeding next to the step 218. However, for the non-triggering possibility the call filtering process 200 may proceed to step 218 without instructions so that in step 218 a default response is performed.

In a step 218 of the call filtering process 200, a response to the incoming phone call is executed. The response may include allowing the phone call through to the telephone 118 via allowing the telephone 118 to ring, play music, or vibrate to notify a user. The response may alternatively include blocking the incoming call. Such blocking may be performed by the call filtering program 110a, 110b, 110c ending the incoming call without directing the incoming call to voice message. The response may include directing the incoming phone call to voicemail. The response may include answering the incoming phone call with a challenge question. The response may alternatively include sending the incoming phone call to an artificial intelligence filter for interactive triage. A user of a device may program the call filtering process 200 to execute a certain process of none of the other policies are triggered. A default response may often be a non-acceptance of the call, as none of the various policies recognized the caller. The non-acceptance may be carried out by ending or blocking the call or sending the call to voicemail.

After step 218 is performed, the call filtering process 200 may end or may return to step 202 to monitor for another incoming phone call and to allow the call filtering process 200 to be repeated for the next incoming phone call.

For each of the individual filters in the call filtering process 200, the call register, the relevant policy, and the relationship corpus may be analyzed to determine if a relationship exists with the calling entity. If a relationship exists, the response for the matching policy may be executed. If a relationship exists but no specific policy matches, a default response for that policy type may be executed. If no relationship exists, a global default response may be executed.

FIG. 3 shows an example of a call register 302 that may be used in the call filtering process 200. The call register may be a list of calls previously made to the telephone 118 or to the computer 102 or that were made by the telephone 118 or the computer 102. The list may include a call outcome for each call, such as call answered or actively suppressed and may include a timestamp, e.g., a time and date of the call. The call register 302 may also include a numeric caller ID for each incoming call and may include an alphanumeric caller ID for the incoming calls. For the outbound calls made by the telephone 118 or the computer 102, the call register 302 may capture telemetry for outbound calls in order to determine whether a new relationship exists. Entries for outgoing calls in the call register 302 may include a number dialed, a contact name and ID of the called party if such is known, and a timestamp for the call. The call registry may be used for understanding user behavior for a certain caller and for certain types of calls. When a new call is received and the call filtering process 200 is performed, the call register 302 may then be updated according to the decision made or the execution performed. If the call was accepted, the call register 302 may be updated to record a length of the call.

FIG. 4 shows an example of a relationship corpus 402 that may be made and used in the call filtering process 200. The call filtering process 200 may include establishing, managing, and updating the relationship corpus 402 based on new calls that are received and a user's reactions to same, new data that is obtained from the user's device, and new data that is obtained from external sources. For each relationship entry in the relationship corpus 402, a type of obtaining the entry may be indicated, a status of the relationship may be indicated, a category of connection or relationship type may be indicated, and a specific expiration day and/or time may be indicated. A source of the relationship entry may be indicated. For example, the source may be a specific app or website which was newly used and/or visited by the device user. The status of the relationship may refer to whether the relationship is active so that their calls should be accepted or is expired so that their calls should be blocked. An active relationship may be a temporary relationship meant to expire after a certain time period, e.g., after a certain time period after a hotel stay or restaurant visit. The relationship corpus 402 may also include entries for known phone numbers for the entry, a known alphanumeric caller ID for the entry, an API URL, and authentication for the user. Authentication information in the relationship corpus 402 may refer to authentication requirements for accessing an API to obtain updates. This authentication information could be a link to credentials or a token stored in another table, database, etc. that may be necessary to access the API provided by the outside party with whom this relationship is formed. The manually defined relationship filter, the learned relationship filter, and the external data source filter may help update this relationship corpus 402 and then access the relationship corpus 402 when deciding how to respond to an incoming call.

Figure 5:
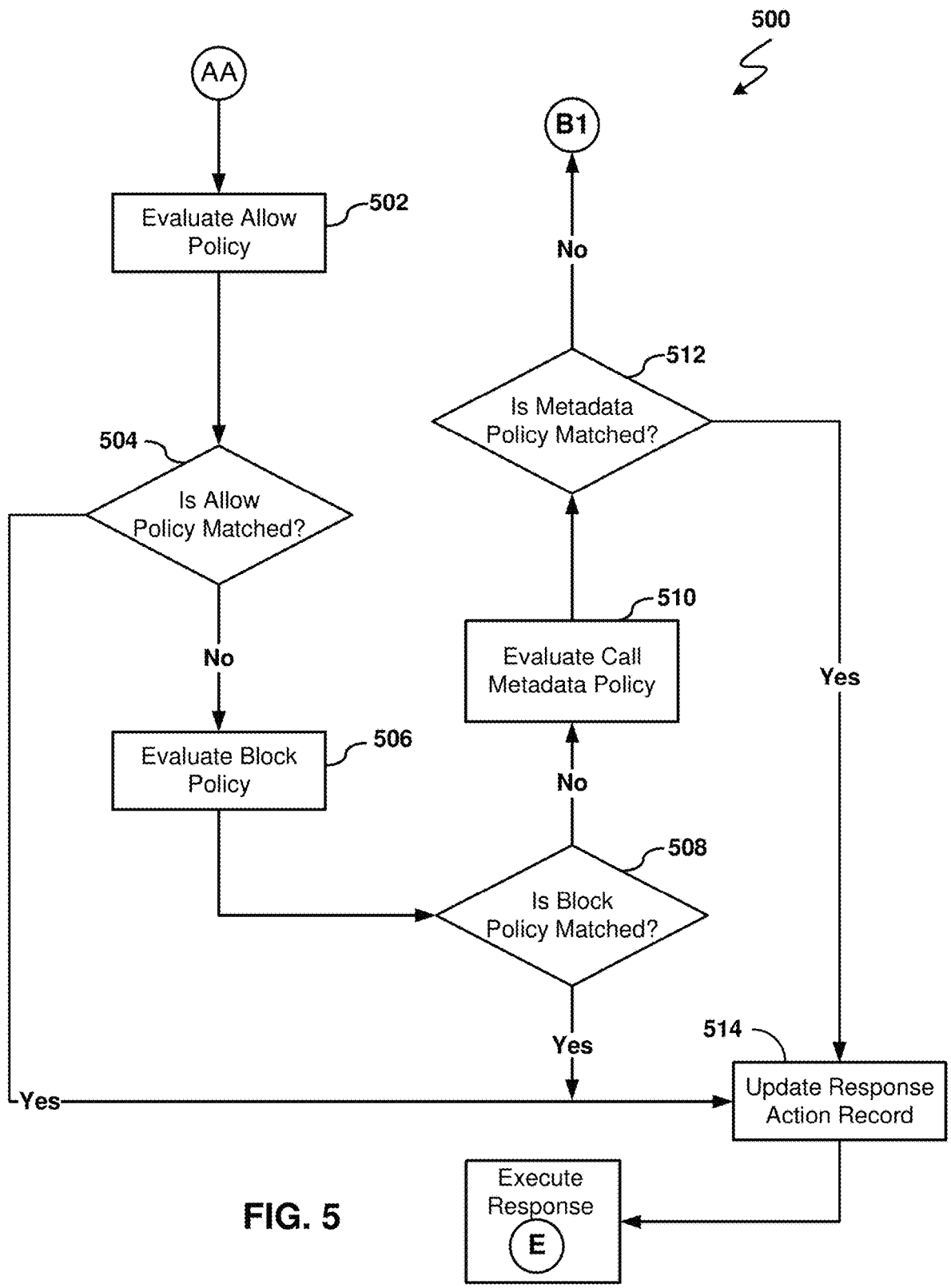
FIG. 5 is an operational flowchart illustrating an application of a static filter in the process for telephone call filtering according to at least one embodiment.

FIG. 5 shows one example of a static filter process 500 that may be part of the call filtering process 200 according to at least one embodiment. FIG. 5 starts after the point AA indicated in FIG. 5 which refers back to step 202 for incoming call monitoring in the call filtering process 200. The static filtering is not required to access the relationship corpus 402 and instead may make its filtering determination using the caller ID information from the incoming call and the time and day of the incoming call and previous entries in the phone device.

In step 502 of the static filter process 500, an allow policy is evaluated. The allow policy may include a manually defined list of numbers to allow, all device contacts, a subset of device contacts meeting some criteria, and a time range. The subset of device contacts may, for example, be favorites, tags, or groups. The time range may be set on a user preference and may be that all times are acceptable or that certain dates/days of the week/hours are acceptable for allowing a call to be received. An allow policy may be saved in the first or second data storage device 106a, 106b. FIG. 6 shows an example of an allow policy. The call filtering program 110a, 110b may use a device processor to access the stored allow policy and the call register 302 in order to obtain data to perform the evaluation. The call register 302 may store information from a presently incoming call. In some instances, information such as call metadata from a presently incoming call may be obtained while bypassing the call register 302.

In step 504 of the static filter process 500, a determination is made as to whether the allow policy is matched. The call filtering program 110a, 110b may use a device processor, e.g., the first or second processor 104a, 104b, respectively, to compare the call metadata from the incoming call with the information from the allow policy. If a match is present, then the static filter process may skip certain steps of the static filter process 500 and proceed to steps 514 and the step 218 "E" from call filtering process 200. As step 504 relates to the allow policy, if the match occurs the execution instruction sent to the response execution step would be to allow the call. If no match occurs for step 504, then the static filter process 500 may proceed to step 506.

FIG. 6 shows an example of an allow policy 602. FIG. 6 shows that the allow policy 602 may include information for calling individuals or entities such as type, filter, a numeric caller ID, an alphanumeric caller ID, an acceptable time for allowing a call from the contact, and notes. A response action for each entry in the allow policy 602 may specify a response of allowing the call to proceed, based on this policy being an allow policy.

In step 506 of the static filter process 500, a block policy is evaluated. The block policy may include a manually defined list of numbers or callers to block and a time range. The time range may be set on a user preference and may be that all times are not acceptable or that certain dates/days of the week/hours are not acceptable for allowing a call to be received. A block policy may be saved in the first or second data storage device 106a, 106b. FIG. 7 shows an example of a block policy. The call filtering program 110a, 110b may use a device processor to access the stored block policy and the call register 302 in order to obtain data to perform the evaluation. The call register 302 may store information from a presently incoming call. In some instances, information such as call metadata from a presently incoming call may be obtained while bypassing the call register 302.

In step 508 of the static filter process 500, a determination is made as to whether the block policy is matched. The call filtering program 110a, 110b may use a device processor, e.g., the first or second processor 104a, 104b, respectively, to compare the call metadata from the incoming call with the information from the block policy. If a match is present, then the static filter process may skip certain steps of the static filter process 500 and proceed to steps 514 and the step 218 "E" from call filtering process 200. As steps 506 and 508 relate to the block policy, if the match occurs the execution instruction sent to the response execution step would be to block or deny the call. If no match occurs for step 508, then the static filter process 500 may proceed to step 510.

FIG. 7 shows an example of a block policy 702. FIG. 7 shows that the block policy 702 may include information for calling individuals or entities such as type, filter, a numeric caller ID, an alphanumeric caller ID, certain times for blocking a call from the specified contact, and notes. A response action for each entry in the block policy 702 may specify a response of blocking the call, based on this policy being designated for blocking.

In step 510 of the static filter process 500, a call metadata policy is evaluated. The call metadata policy may include spoofed or non-compliant use of caller ID fields, international calls, calls from specific countries or areas, area code or partial caller ID matches, and associated responses and time ranges. An area code or partial caller ID match may be for a certain number of digits of a phone number, e.g., the first six digits. For example, the incoming number 555-543-XXXX may be considered a match aside from the last four digits. The time range may be set by user preference and may indicate that all times are acceptable or not acceptable or that certain dates/days of week/hours of day are acceptable or not acceptable. Different call filtering responses may be output depending on the day or time of the call. A call metadata policy may be saved in the first or second data storage device 106a, 106b. FIG. 8 shows an example of a call metadata policy. The call filtering program 110a, 110b may use a device processor to access the call metadata policy and the call register 302 in order to obtain data to perform the evaluation. The call register 302 may store information from a presently incoming call. In some instances, information such as call metadata from a presently incoming call may be obtained while bypassing the call register 302. The call filtering program 110a, 110b may use call metadata of an incoming phone call even if the static filter is bypassed or not used.

In step 512 of the static filter process 500, a determination is made as to whether the call metadata policy is matched. The call filtering program 110a, 110b may use a device processor, e.g., the first or second processor 104a, 104b, respectively, to compare the call metadata from the incoming call with the information from the call metadata policy. If a match is present, then the static filter process may proceed to steps 514 and the step 218 "E" from call filtering process 200 with a response instruction according to the call metadata policy. Such response could be to allow or deny the call or some other response. If no match occurs for step 512, then the static filter process 500 may proceed to the manually defined relationship filter as indicated by point B1 in FIG. 5 which refers to step 208 in call filtering process 200 shown in FIG. 2.

FIG. 8 shows an example of a call metadata policy 802. FIG. 8 shows that the call metadata policy 702 may include information for calling individuals or entities such as a filter, a numeric caller ID, an alphanumeric caller ID, certain times for the specified response for a call from the specified contact, a response action, and notes. FIG. 8 shows that the response actions for the entries in the call metadata policy 802 may specify varying responses for the incoming call, e.g., blocking allowing, sending to voicemail, or sending to an AI filter.

If any of steps 504, 508, or 512 are positive for a match, then the static filter process 500 proceeds to step 514 and the response action record is updated. The execution response determined in the static filter process 500 and one or more timestamps of decision and/or execution may be recorded in the response action record which may be stored in the response register in the first or second data storage device 106a, 106b or in the database 114. The execution response and one or more timestamps may be recorded in connection with the data from the incoming call that has been submitted through the call filter(s).

In a step 218 "E" of the call filtering process 200, a response to the incoming phone call is executed. The response may include allowing the phone call through to the telephone 118 via allowing the telephone 118 to ring, play music, or vibrate to notify a user. This allow response would correspond to and may be performed in response to a match from the allow filter. The response may alternatively include blocking the incoming call. Such blocking may be performed by the call filtering program 110a, 110b, 110c ending the incoming call without directing the incoming call to voice message. This blocking response would correspond to and may be performed in response to a match from the block filter. Other responses may be performed, e.g. for unique responses designated for call metadata matches, and as described above with respect to step 218.

Figure 9:
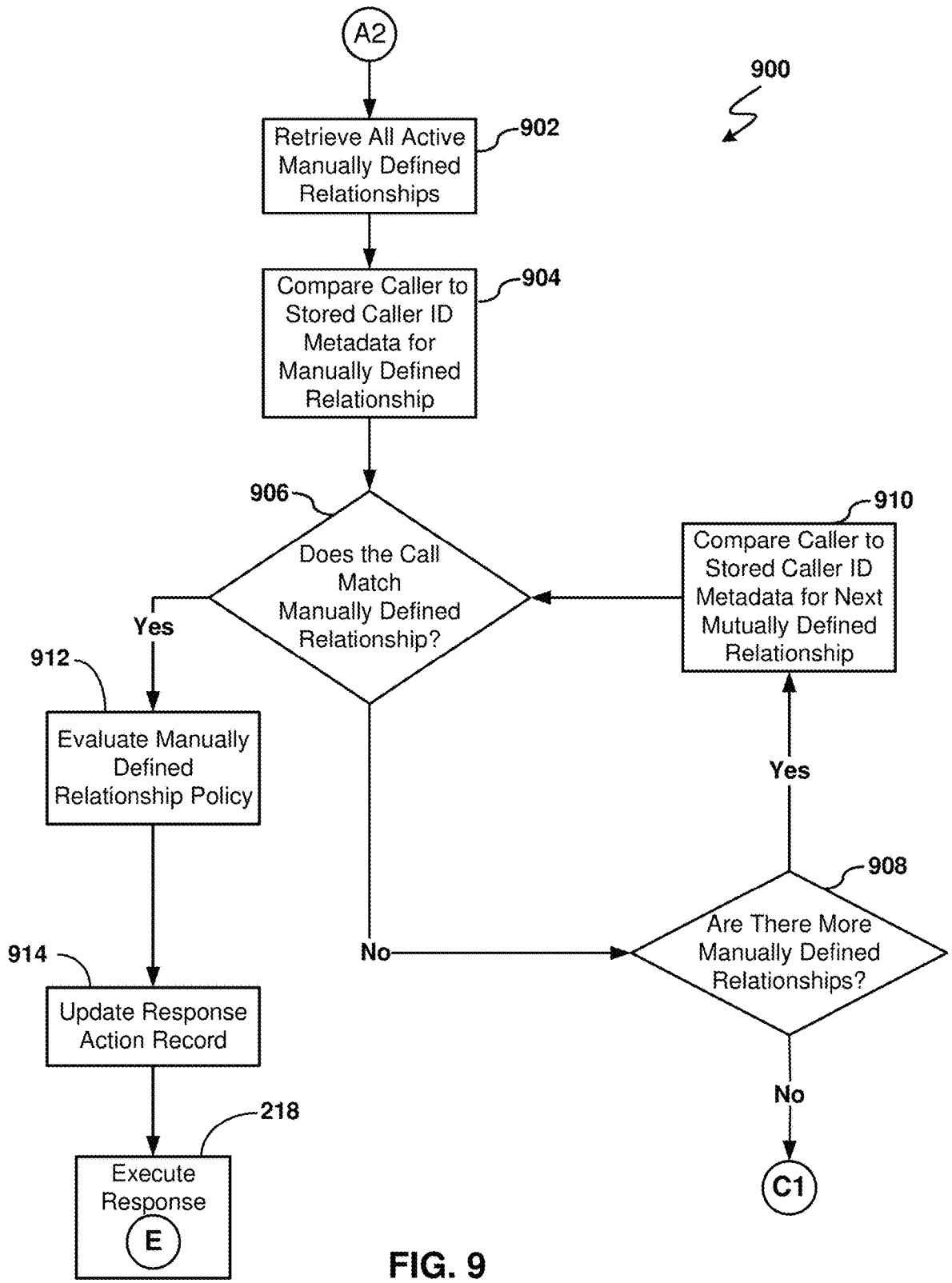
FIG. 9 is an operational flowchart illustrating an application of a manually defined relationship filter in the process for telephone call filtering according to at least one embodiment.

FIG. 9 shows one example of a manually defined relationship filter process 900 that may be part of the call filtering process 200 according to at least one embodiment. FIG. 9 starts after the point A2 indicated in FIG. 9 which refers back to step 206 related to the static filter of the call filtering process 200. The manually defined relationship filtering may include a user manually entering in information, e.g., relationship information, into the relationship corpus 402 of the call filtering program 110a, 110b, 110c. This manually defined relationship filtering may check against manually defined relationships such as a relationship with a bank, a doctor, a dentist, an insurance company or an insurance agent, or a credit card company of the device user, e.g., of the user of the telephone 118.

In step 902 of the manually defined relationship filter process 900, all active manually defined relationships are retrieved from the relationship corpus 402. This step 902 may include a checking of manually defined relationship entries in the relationship corpus 402 to identify which are expired due to a time window being exceeded. Each entry may be indicated, according to a user preference and manual entry, as being allowable for a specified time. An expiration day and/or time may be entered manually by the device user into a manual relationship entry in the relationship corpus 402. The user may type this information into a keyboard of the telephone 118 or speak this information that is captured by a microphone of the telephone 118. The retrieval of step 902 may retrieve the entity name and caller ID metadata for the active manual relationship entities or entries. This caller ID metadata may be up to date as confirmed via a web query to a website operated by the entity, e.g., a doctor or an insurance company. This retrieval may be performed by a processor, e.g., the first or second processor 104a, 104b, accessing the relationship corpus 402 stored in the first or second data storage device 106a, 106b, respectively. For embodiments in which the relationship corpus is stored in cloud storage, e.g., in the database 114 of the server 112, this retrieval may be performed via a data transmission through a communication network, e.g., through the second communication network 116b. An example of updating these manually defined relationship entries is described subsequently with respect to FIG. 16.

In step 904 of the manually defined relationship filter process 900, the caller of the incoming call may be compared to the stored caller ID metadata for the manually defined relationship. This relationship may be that retrieved in step 902. This comparison may be performed by a processor, e.g., the first or second processor 104a, 104b, of the computer 102 or of the telephone 118. The information of the incoming call may be obtained from the call register 302 or from another direct route from the computer 102 or telephone 118 receiving data sent with the incoming call.

In step 906 of the manually defined relationship filter process 900, a determination is made as to whether the incoming call matches the manually defined relationship. A match may be a perfect match or a substantial match. If step 906 results in a positive determination, then the manually defined relationship filter process 900 proceeds to step 912.

If step 906 results in a negative determination, then the manually defined relationship filter process 900 proceeds to step 908.

In step 908 of the manually defined relationship filter process 900, a determination is made as to whether more active manually defined relationships were retrieved in step 902. A processor of the call filtering program 110a, 110b may check whether any additional manually defined relationship entry is present in a queue in which the retrieved manually defined relationship entries are present. If step 908 results in a positive determination, then the manually defined relationship filter process 900 proceeds to step 910. If step 908 results in a negative determination, then the manually defined relationship filter process 900 proceeds to point C1 which refers back to step 212 related to a learned relationship filter as shown in FIG. 2.

In step 910 of the manually defined relationship filter process 900, the caller of the incoming call is compared to the stored caller ID metadata for the next mutually defined relationship. Step 910 performs a repeat of the step 904 but for a different active entry of the active manually defined relationships retrieved from the relationship corpus 402. Step 910 leads to a repeat of the step 906 which is another determination.

Thus, steps 906, 908, and 910 may form an iterative loop that may search through each entry retrieved from step 902 until a match is found or until the search moves through all retrieved entries and no match is found. Once all entries are searched and no match is found, then as explained above the manually defined relationship filter process 900 may proceed after step 908 to the point C1 from FIG. 2 related to a learned relationship filter.

If a match is found in the first or a subsequent performance of step 906, then step 912 of the manually defined relationship filter process 900 is performed to evaluate the manually defined relationship policy. In some embodiments, the call filtering program 110a, 110b, 110c may always have a default response execution established in the policy if a match for a manually defined relationship was present. The manually defined relationship policy may include a time range such as all times or certain dates, days of week, or hours of the day when a specified response execution is relevant. A processor of the call filtering program 110a, 110b, 110c may in the evaluation retrieve the policy response specified and forward the response for execution for the filtering of the incoming call.

In step 914 of the manually defined relationship filter process 900, a response action record is updated. The execution response determined in the manually defined relationship filter process 900 and one or more timestamps of decision and/or execution may be recorded in the response action record which may be stored in the response register in the first or second data storage device 106a, 106b or in the database 114. The execution response and one or more timestamps may be recorded in connection with the data from the incoming call that has been submitted through the call filter(s).

The manually defined relationship filter process 900 may also end with the performance of the response execution in step 218 of call filtering process 200. The response execution may be based on the response determined in step 912 and may include allowing the phone call through to the telephone 118 or denying the phone call or some other response as specified above.

FIG. 10 shows an example a manually defined relationship policy 1002 that may be implemented in the manually defined relationship filter process 900. The response action entered in and stored in the manually defined relationship policy 1002 may be used as the response to an incoming call when the incoming call data matches the manual relationship entry data. The manually defined relationship policy 1002 may include entries such as a relationship reference (a reference to an identifier in the relationship corpus 402), an expiration day or time when the specified response action is to expire, days and time when the specified response action is active or not active, and notes for the entry. For the example shown in FIG. 10, the relationship reference #24 equals ACME Bank and the relationship reference #25 equals Alpha Dental. In FIG. 10, a relationship reference to a single relationship is shown, but the policy can apply to multiple relationships. A user may set a default response action such as allow, voicemail, etc. for manual relationships that do not match a more specific policy.

Figure 11:
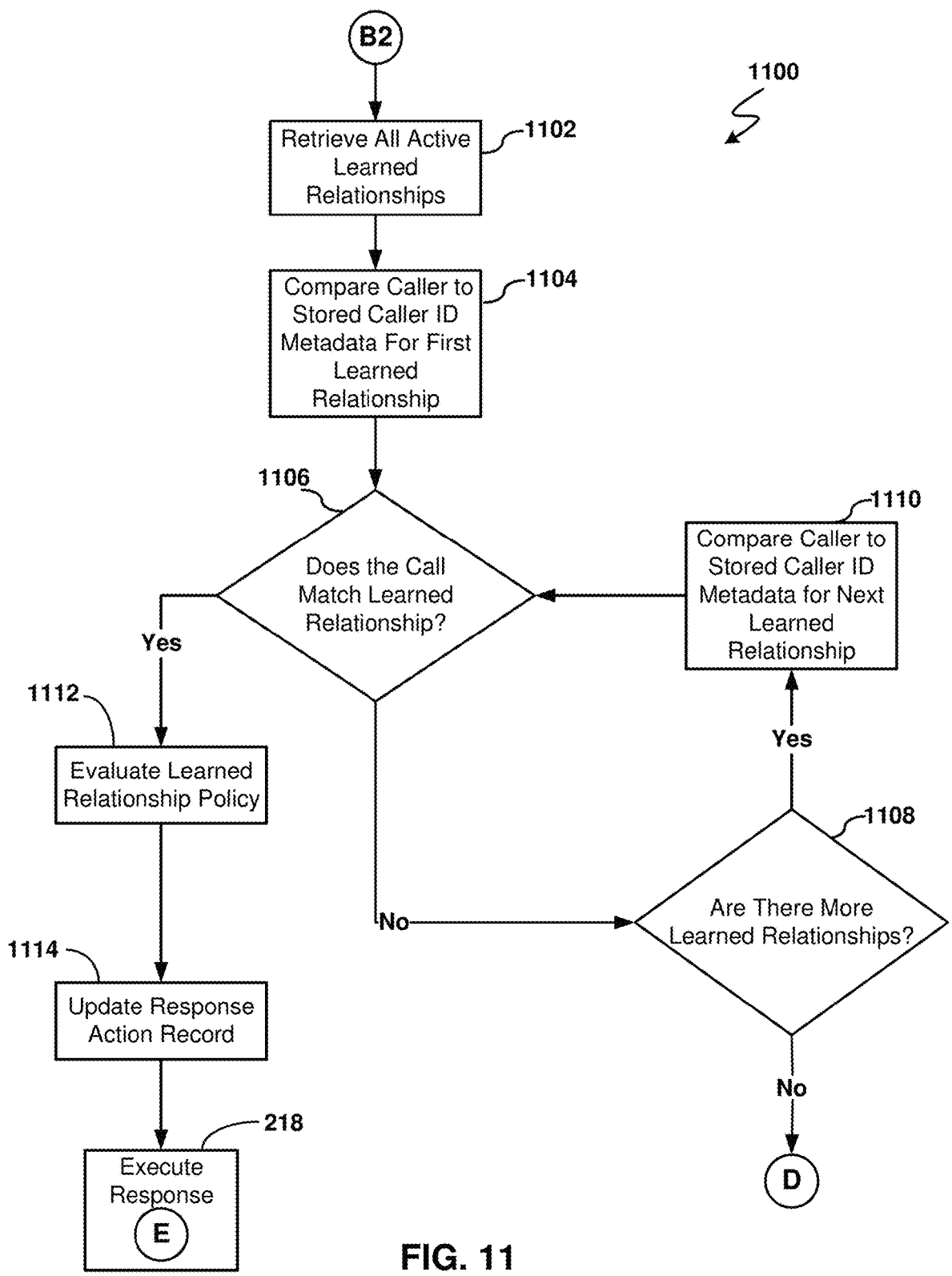
FIG. 11 is an operational flowchart illustrating an application of a learned relationship filter in the process for telephone call filtering according to at least one embodiment.

FIG. 11 shows one example of a learned relationship filter process 1100 that may be part of the call filtering process 200 according to at least one embodiment. FIG. 11 starts after the point B2 indicated in FIG. 11 which refers back to step 210 related to the manually defined relationship filter of the call filtering process 200. The learned relationship filter may include accessing entries in a list that is continuously updated based on user behavior on the user device. The user behavior may include ignoring an incoming phone call from a specific number, type of number, or range of numbers, hanging up on a received phone call, and usage of apps or web browsing on the user device. The apps may include but are not limited to those for making restaurant reservations, hotel reservations, airline reservations, messaging, or email. The learned relationship filtering may include accessing information and entries from the relationship corpus 402 and of a learned relationship policy of the call filtering program 110a, 110b, 110c.

In step 1102 of the learned relationship filter process 1100, all active learned relationships are retrieved from the relationship corpus 402. This step 1102 may include a checking of learned relationship entries in the relationship corpus 402 to identify which are expired due to a time window being exceeded. Each entry may be indicated, according to a user preference and machine learning output, as being allowable for a specified time. An expiration day and/or time may be listed for a learned relationship entry in the relationship corpus 402. The retrieval of step 1102 may retrieve the entity name and caller ID metadata for the active learned relationship entities. This caller ID metadata may be up to date as confirmed via a web query to a website operated by the entity, e.g., a restaurant or a hotel. This retrieval may be performed by a processor, e.g., the first or second processor 104a, 104b, accessing the relationship corpus 402 stored in the first or second data storage device 106a, 106b, respectively. For embodiments in which the relationship corpus 402 is stored in cloud storage, e.g., in the database 114 of the server 112, this retrieval may be performed via a data transmission through a communication network, e.g., through the second communication network 116b. Examples of forming or updating these learned relationship entries are described subsequently with respect to FIGS. 15 and 16.

In step 1104 of the learned relationship filter process 1100, the caller of the incoming call may be compared to the stored caller ID metadata for the learned relationship. This learned relationship may be that retrieved in step 1102. This comparison may be performed by a processor, e.g., the first or second processor 104a, 104b, of the computer 102 or of the telephone 118. The information of the incoming call may be obtained from the call register 302 or from another direct route from the computer 102 or telephone 118 receiving data sent with the incoming call.

In step 1106 of the learned relationship filter process 1100, a determination is made as to whether the incoming call matches the learned relationship. A match may be a perfect match or a substantial match. If step 1106 results in a positive determination, then the learned relationship filter process 1100 proceeds to step 1112. If step 1106 results in a negative determination, then the learned relationship filter process 1100 proceeds to step 1108.

In step 1108 of the learned relationship filter process 1100, a determination is made as to whether more active learned relationships were retrieved in step 1102. A processor of the call filtering program 110a, 110b may check whether any additional learned relationship entry is present in a queue for the retrieved entries. If step 1108 results in a positive determination, then the learned relationship filter process 1100 proceeds to step 1110. If step 1108 results in a negative determination, then the learned relationship filter process 1100 proceeds to point D which refers to step 216 related to an external data source filter as shown in FIG. 2.

In step 1110 of the learned relationship filter process 1100, the caller of the incoming call is compared to the stored caller ID metadata for the next learned relationship. Step 1110 performs a repeat of the step 1104 but for a different active entry of the active learned relationships retrieved from the relationship corpus 402. Step 1110 leads to a repeat of the step 1106 which is another determination.

Thus, steps 1106, 1108, and 1110 may form an iterative loop that may search through each entry retrieved from step 1102 until a match is found or until the search moves through all retrieved learned relationship entries and no match is found. Once all entries are searched and no match is found, then as explained above the learned relationship filter process 1100 may proceed after step 1108 to the point D from FIG. 2 related to an external data source filter.

If a match is found in the first or a subsequent performance of step 1106, then step 1112 of the learned relationship filter process is performed to evaluate the learned relationship policy. In some embodiments, the call filtering program 110a, 110b, 110c may always have a default response execution established in the learned relationship policy if a match for a learned relationship entry was present. The learned relationship policy may include a time range such as all times or certain dates, days of week, or hours of the day when a specified response execution is relevant. A processor of the call filtering program 110a, 110b, 110c may in the evaluation retrieve the policy response specified and forward the response for execution for the filtering of the incoming call.

In step 1114 of the learned relationship filter process 1100, a response action record is updated. The execution response determined in the learned relationship filter process 1100 and one or more timestamps of decision and/or execution may be recorded in the response action record which may be stored in the response register in the first or second data storage device 106a, 106b or in the database 114. The execution response and one or more timestamps may be recorded in connection with the data from the incoming call that has been submitted to or through the call filter(s).

The learned relationship filter process 1100 may also end with the performance of the response execution in step 218 of call filtering process 200. The response execution may be based on the response determined in step 1112 and may include allowing the phone call through to the telephone 118 or denying the phone call or some other response as specified above.

FIG. 12 shows a learned relationship policy 1202 that may be implemented in the learned relationship filter process 1100. The response action entered in and stored in the learned relationship policy 1202 may be used as the response to an incoming call when the incoming call data matches the learned relationship entry data. The learned relationship policy 1202 may include entries such as a relationship reference (a reference to a relationship listed in the relationship corpus 402), an expiration day or time when the specified response action is to expire, days and time when the specified response action is active or not active, and notes for the entry. For the example shown in FIG. 12, the relationship reference #26 equals Hotel New York, the relationship reference #27 equals The Steakhouse, the relationship reference #28 equals Hotel Chicago, and the relationship reference #29 equals Unknown (Robo dialer). In FIG. 12, a relationship reference to a single relationship is shown, but the policy can apply to multiple relationships. A user may set a default response action such as allow, voicemail, etc. for manual relationships that do not match a more specific policy.

Expiration of a relationship in the learned relationship policy 1202 may match that of the relationship defined in the relationship corpus 402 or may be different. For example, for a relationship with a hotel that started with making a hotel reservation, the expiration listed in the relationship corpus 402 may be seven days after the check-out from the hotel after conclusion of the hotel stay. In contrast, the learned relationship policy 1202 may allow a call from that hotel for one day after checkout. Then after the one-day time period and until expiration of the relationship, e.g., for six more days, a call from the hotel may be passed to voicemail. After the expiration, the call may be blocked, still sent to voicemail, or subjected to a challenge question or questions. A default response for an expired relationship may be to submit challenge questions to the caller. This allowance of the call from the hotel to be allowed for a limited time after the hotel stay may help by receiving calls from the hotel that relate to follow up from the stay, e.g., a call related to payment, a damaged room, or lost goods. This time window may have a specified duration, e.g., as explained above be a week or a day or a few days. After use of a ride-hailing app, the specified duration of time window to receive a call from a phone number associated with the ride-hailing app may be less than an hour and may be slightly longer than an expected completion time of the ride. The monitoring may capture from messaging the expected ride completion time to use it to calculate the expiration of a call window for the ride-sharing phone number.

Figure 13:
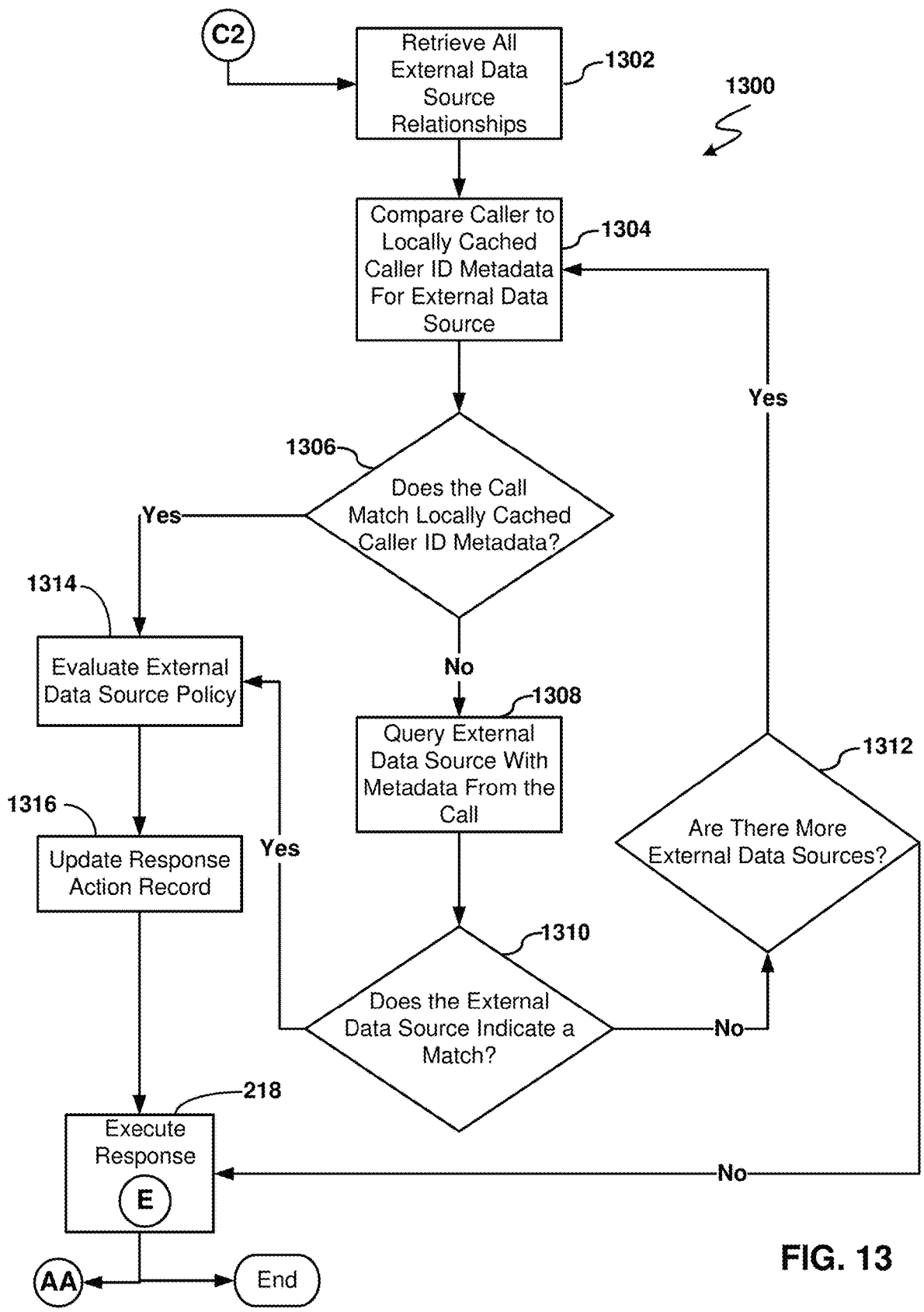
FIG. 13 is an operational flowchart illustrating application of an external source filter in the process for telephone call filtering according to at least one embodiment.

FIG. 13 shows one example of an external data source filter process 1300 that may be part of the call filtering process 200 according to at least one embodiment. FIG. 13 starts after the point C2 indicated in FIG. 13 which refers back to step 214 related to the learned relationship filter of the call filtering process 200. The external data source policy may relate to integrations to support third party services and may check against lists of permitted or blocked numbers maintained by external entities. This policy may relate to integration for data that is stored and kept by third or external parties who have some connection or relationship to the user of the telephone 118 or the computer 102. This filter may include checking for updated lists of allowed phone numbers from an enterprise directory for a company, cell plan providers, e.g., permitted numbers by a group of mobile devices, e.g., if allowed by any member of a device user's family or small business coworkers, mobile device management platforms, and manually allowed categories of callers. This filter may include checking for updated lists of blocked phone numbers such as manually blocked categories of callers, use of third-party malicious caller lists, and manually defined blocked entities. This policy may relate to checking with external caller category engines, e.g., financial categories. This policy may also include time categories for the various policy entries in order to indicate acceptable times, dates, or days of week to accept calls from certain callers.

In step 1302 of the external data source filter process 1300, all active external data sources are retrieved. This retrieval may be from the relationship corpus 402 that may be locally stored in the telephone 118 or computer 102 or may be stored in the cloud, e.g., at the server 112 for use in the call filtering program 110a, 110b, 110c. This step 1302 may include a checking of external data source entries in the relationship corpus 402 to identify which are expired due to a time window being exceeded. Each entry may be indicated, according to a user preference and/or an external data source preference, as being allowable for a specified time. An expiration day and/or time may be listed for an external data source entry in the relationship corpus 402. The retrieval of step 1102 may retrieve the entity name and caller ID metadata for the active external data source entities. This retrieval of step 1302 may be performed by a processor, e.g., the first or second processor 104a, 104b, accessing the relationship corpus 402 stored in the first or second data storage device 106a, 106b, respectively. For embodiments in which the relationship corpus 402 is stored in cloud storage, e.g., in the database 114 of the server 112, this retrieval of step 1302 may be performed via a data transmission through a communication network, e.g., through the second communication network 116b.

The external data source entries in the relationship corpus 402 may be entered by scheduled or unscheduled checks with the external data source. The call filtering program 110a, 110b, 110c may store connectivity information for connecting to an external data source in order to obtain contact information from the external data source. Such connectivity information may include an IP address/port, a URL, authentication credentials, a certificate, etc. An example of forming or updating these entries from external data sources is described subsequently with respect to FIG. 17.

In step 1304 of the external data source filter process 1300, the caller of the incoming call may be compared to the locally cached caller ID metadata for a first external data source. This locally cached caller ID metadata may be that retrieved in step 1302. This comparison may be performed by a processor, e.g., the first or second processor 104a, 104b, of the computer 102 or of the telephone 118. The information of the incoming call may be obtained from the call register 302 or from another direct route from the computer 102 or telephone 118 receiving data sent with the incoming call.

Some data sources may allow storage of or may store some data locally, e.g., at the telephone 118 or at the computer 102 of the user. Such locally stored data may include a list of phone numbers associated with a cellular plan for a small business.

Other external data source providers may not allow local storage, e.g., by a user of the telephone 118 at the telephone 118 or of the computer 102 at the computer 102. For example, an enterprise directory may not allow local storage of a list of their phone numbers. For these other providers, steps 1304 and 1306 may be skipped with the external data source filter process 1300 proceeding to step 1308, because no locally cached caller ID metadata is available for or at the telephone 118 or at the computer 102.

In step 1306 of the external data source filter process 1300, a determination is made as to whether the incoming call matches the locally cached caller ID metadata. If step 1306 results in a positive determination, then the external data source filter process 1300 proceeds to step 1314. If step 1306 results in a negative determination, then the external data source filter process 1300 proceeds to step 1308.

In step 1308 of the external data source filter process 1300, an external data source is queried with metadata from the call. This step 1308 may include a check to determine whether connectivity with the external data source is available. This step 1308 may also include a check as to whether real time queries are based on the available data transport for the telephone 118 or the computer 102, e.g., whether a current Wi-Fi connection or a current cellular connection is sufficient or permitted. This step 1308 may include the telephone 118, the computer 102, or the server 112 sending a query request via the first communication network 116a or the second communication network 116b to the external data source and then receiving a query response from the external data source via the first communication network 116a or the second communication network 116b. An example of step 1308 is the call filtering program 110a, 110b, 110c sending a numeric ID (e.g., 555-555-5555) or alphanumeric ID, from the incoming call, to an enterprise directory to query whether the enterprise directory recognizes that numeric ID or alphanumeric ID as being one of their employees. Another example of step 1308 is the call filtering program 110a, 110b, 110c sending a numeric ID (e.g., 555-555-5555) or alphanumeric ID, from the incoming call, to a robo dialer registry service to query whether the robo dialer registry service recognizes that numeric ID or alphanumeric ID as being a known robo dialer. Another example of step 1308 is the call filtering program 110a, 110b, 110c sending a numeric ID (e.g., 555-555-5555) or alphanumeric ID, from the incoming call, to a cell phone provider to query whether the cell phone provider recognizes that numeric ID or alphanumeric ID as being part of a small business plan of the cell phone user.

In step 1310 of the external data source filter process 1300, a determination is made as to whether the external data source indicates a match. If step 1310 results in a positive determination, then the external data source filter process 1300 proceeds to step 1314. If step 1310 results in a negative determination, then the external data source filter process 1300 proceeds to step 1312. The external data source may transmit an affirmative or negative response via a communication network, e.g., the first or second communication network 116a, 116b, to the telephone 118, to the computer 102, or to the server 112 in response to the query of step 1308.

In step 1312 of the external data source filter process 1300, a determination is made as to whether there are more external data source entries. A processor of the call filtering program 110a, 110b may check whether any additional external data source entry is present in a queue in which the retrieved entries are present. If step 1312 results in a positive determination, then the external data source filter process 1300 proceeds back to step 1304 for a repeat of this step 1304. If step 1312 results in a negative determination, then the external data source filter process 1300 proceeds to the execute response step 218 that was shown in FIG. 2.

For the repeat of step 1304 that may occur, the caller of the incoming call is compared to the locally cached stored caller ID metadata for the next external data source. This repeat of step 1304 may be performed in the same manner as the first performance of step 1304 but with respect to a different external data source. This repeat of step 1304 leads to a repeat of the step 1306 which is another determination as to whether the comparison of step 1304 results in a match.

Thus, steps 1304, 1306, 1308, 1310, and 1312 may form an iterative loop that may search through each external data source, for which a relationship from step 1302 was retrieved, until a match is found or until the search moves through all retrieved external data sources of the external data source entries and no match is found. Once all entries and/or external data sources are searched and no match is found, then as explained above the external data source filter process 1300 may proceed after step 1312 to the step 218 from FIG. 2 for executing a filter response to the incoming call.

If a match is found in the first or a subsequent performance of steps 1306 or 1310, then step 1314 of the external data source filter process 1300 is performed to evaluate the external data source policy. In some embodiments, the call filtering program 110a, 110b, 110c may always have a default response execution established in the external data source policy if a match for an external data source entry was present. The external data source policy may include a time range such as all times or certain dates, days of week, or hours of the day when a specified response execution is relevant. A processor of the call filtering program 110a, 110b, 110c may in the evaluation retrieve the policy response specified and forward the response for execution for the filtering of the incoming call.

In step 1316 of the external data source filtering process 1300, a response action record is updated. The execution response determined in the external data source filtering process 1300 and one or more timestamps of decision and/or execution may be recorded in the response action record which may be stored in the response register in the first or second data storage device 106a, 106b or in the database 114. The execution response and one or more timestamps may be recorded in connection with the data from the incoming call that has been submitted to or through the call filter(s). When the step 1314 is performed due to a match being present amongst the external data source relationships with respect to the incoming call, it may be assumed that some default response policy is stored for that external data source match.

The external data source filtering process 1300 may end with the performance of the response execution in step 218 of call filtering process 200. The response execution may be based on the response determined in step 1314 and may include allowing the phone call through to the telephone 118 or denying the phone call or some other response as specified above. When the external data source filtering process 1300 proceeded from step 1312 to step 218 due to no match being present amongst the external data source relationships, a default response execution policy may be performed in step 218. For example, the call filtering program 110a, 110b, 110c may as a default block the call or send the call to voicemail, as no match was recognized for any of the stored relationships from the filters performed.

In the external data source filtering process 1300 a local data check followed by a real time query to external source check occur sequentially for each external data source of the user device. Thus, both checks would occur for a first external data source before performing either check for a subsequent external data source.

In an alternative external data source filtering process, the local data check (with respect to locally cached caller ID data on the user device) for each external data source may be performed before any real time query to the external source is performed. Then each real time query to the external source may be performed after all or some of the local data checks are completed.

FIG. 14 shows an external data source policy 1402 that may be implemented in the external data source filter process 1300. The response action entered in and stored in the external data source policy 1402 may be used as the response to an incoming call when the incoming call data matches the external data source entry data. The external data source policy 1402 may include entries such as a relationship reference, an expiration day or time when the specified response action is to expire, days and time when the specified response action is active or not active, and notes for the entry. The relationship reference may refer to entries within the relationship corpus 402. In this example of FIG. 14, reference #30 refers to ACME Enterprise Director and reference #31 refers to Robo dialer Intelligence Provider as can be seen in FIG. 4. A user may set a default response action such as allow, voicemail, etc. for external data source entries that do not match a more specific policy.

FIG. 15 shows an example of a learned relationship identifying process 1500 that may generate learned relationship entries to be used in the filtering processes shown in FIG. 11 and in FIG. 2. FIG. 15 shows that the learned relationship identifying process 1500 may be an endless loop which indicates that the updating and monitoring that occur through these identifications may be continuous and ongoing for a user of a telephone 118 or a computer 102 who participates in the call filtering program 110a, 110b, 110c. As the learned relationship identifying process 1500 includes monitoring much or all of a user's usage of a device, e.g., a phone or a computer, in order to improve call filtering, the call filtering program 110a, 110b, 110c may provide notice to a user and obtain consent from the user before performing such device monitoring.

In step 1502 of the learned relationship identifying process 1500, incoming/outgoing call activity of the user is monitored. For example, the calls that the user makes or receives on the telephone 118 or on the computer 102 may be monitored. These monitored calls may include voice calls, video calls, etc. This step 1502 may include a processor accessing the call register 302 to obtain information regarding any call made or received by the device user. This monitoring of step 1502 may help the call filtering program 110a, 110b, 110c recognize a relationship of the user from whom the user would like to receive calls but for whom the user has never manually entered in information for that relationship into the contact list of the phone or into the relationship corpus 402 of the call filtering program 110a, 110b, 110c. This monitoring may include recognizing each call made or received and a duration of the call. The call duration information may also be obtained via the call register 302.

In step 1504 of the learned relationship identifying process 1500, app use on the device is monitored. This step 1504 may be performed with respect to the device, e.g., the telephone 118 or the computer 102, on which the call filtering program 110a, 110b, 110c filters phone calls for the use. The call filtering program 110a, 110b, 110c may access an app activity log on the telephone 118 or on the computer 102 to obtain the information about app activity usage. For example, this step 1504 may monitor whether a user uses an app to make a reservation at a restaurant or a hotel. Examples of apps that may be monitored include hotel reservations apps, banking apps, restaurant reservation apps, insurance apps, travel apps, and ride-share apps, etc.

In step 1506 of the learned relationship identifying process 1500, app APIs or web APIs are queried to identify events indicating a potential relationship. Such events may include making a reservation at a restaurant or a hotel, transferring or receiving money via a banking app, submitting an insurance claim via an insurance app, booking a flight via a travel app, or hiring a driver for a ride via a ride-share app, etc. This step 1506 may include monitoring web browsing of the user on the device, e.g., on the telephone 118 or on the computer 102 to identify new potential relationships to the user based on the web browsing activity.

In step 1508 of the learned relationship identifying process 1500, device communications are monitored. Such device communications may include those via email, SMS-text messaging, MMS-messaging, and via other known communication platforms such as WhatsApp® (WhatsApp® and all WhatsApp-based trademarks and logos are trademarks or registered trademarks of WhatsApp LLC and/or its affiliates) and Slack® (Slack and all Slack-based trademarks and logos are trademarks or registered trademarks of Slack Technologies, Inc. and/or its affiliates). These communications may be referred to as text-based communications. This step 1508 may result in identifying communications that indicate a potential relationship for the communication recipient from whom the device user may wish to receive a telephone call. Such potential relationships may be identified via an email or text message confirming the booking for a flight or confirming a restaurant reservation.

In step 1510 of the learned relationship identifying process 1500, the gathered data is evaluated. This data may refer to the data gathered via one or more of steps 1502, 1504, 1506, and 1508. The data gathered may indicate parties with whom the device user may have reason for a telephone conversation and which may be classified as a possible learned relationship to be added as approved or denied for call filtering. Data from step 1502 may indicate that multiple ignored calls came from the same area code and prefix, which may mean that other calls from the same area code and prefix should be put on the block list. Data from steps 1504, 1506, and/or 1508 may indicate that a restaurant reservation was made to visit and eat at a restaurant. Thus, the step 1510 may evaluate that the user would like to accept any phone call from the restaurant in the time leading up to the reservation and for some specified duration thereafter, e.g., two or three days after the reservation. A phone call made by the restaurant within two or three days of the reservation may be due to an object having been left by the device user at the restaurant or may be due to a question or issue about payment made for the food. A user may wish to not accept phone calls from the restaurant outside of this time period around the reservation, as a phone call outside of this time window may be for marketing purposes. Step 1510 may evaluate that the user is participating in an active email conversation with a party that has a telephone number in the signature. The call filtering program 110a, 110b, 110c may use natural language processing (NLP) on the email to obtain the phone number as one for which a call might be received and which should be allowed to be answered by the user when a call is made. Such NLP techniques may be used on messaging, emails, app activity, and web activity that is monitored in one of steps 1504, 1506, and 1508. The monitoring may include the identification of one or more negative interactions with an outside entity which will cause the automated system to propose blocking a future call from that outside entity. The automated system may use NLP techniques to identify words indicating a contention or a strong contention. Such a proposal may be generated after one such contentious interaction or after multiple such interactions with a particular outside entity.

In step 1512 of the learned relationship identifying process 1500, a determination is made as whether any new relationship was identified via step 1510. If the determination of step 1512 is answered in the negative, then the learned relationship identifying process 1500 may proceed back to repeat steps 1502, 1504, 1506, and/or 1508 for additional monitoring. If the determination of step 1512 is answered in the affirmative, then the learned relationship identifying process 1500 proceeds to step 1514.

In step 1514 of the learned relationship identifying process 1500, a draft learned relationship is defined. This step 1514 may include gathering information including an entity name, known caller metadata, a status, and/or an expiration date that may be entered into an entry for the new learned relationship. NLP techniques may be used by the call filtering program 110*a*, 110*b*, 110*c* to gather such information. The call filtering program 110*a*, 110*b*, 110*c* may include a default expiration time, e.g., day and/or time, based upon the nature of the interaction with the entity. For example, an interaction for a hotel reservation may have a default expiration period of one week after the conclusion of the hotel stay. An interaction for a restaurant reservation may have a default expiration period of two or three days after the day of the reservation.

In step 1516 of the learned relationship identifying process 1500, the relationship information from step 1514 is enriched with relevant caller ID or other relationship metadata. The information for enrichment may, for example, be obtained via caller directory services, entity APIs, categorization services, or other sources. The call filtering program 110*a*, 110*b*, 110*c* may add this enrichment information to the preliminary entry information gathered in step 1514.

In step 1518 of the learned relationship identifying process 1500, a proposed relationship and relationship policy are staged for user review. This staging may include preparing a presentation of the proposal. The call filtering program 110*a*, 110*b*, 110*c* may prepare and generate a graphical user interface (GUI) with the proposal for displaying the proposal to the user, e.g., via a display screen of the telephone 118 or of the computer 102. The GUI may include a portion to solicit and receive a response from the user. For example, the GUI may include a text box around the proposed response, so that the user can scroll and select an alternative filter response rather than the one proposed and presented by the automated system. The proposal may include a time range or expiration for the proposed relationship, for example a week after a hotel stay or two or three days after a restaurant visit. The proposal may be presented in the form of an entry for the relationship corpus 402 and/or for the learned relationship policy 1202. The proposal may be presented with an entity, known caller metadata, the expiration date, and a proposed response, e.g., allow, block etc. The presentation may be done audibly as an alternative or addition to the visual presentation.

In step 1520 of the learned relationship identifying process 1500, the user reviews and adjusts the relationship and associated learned relationship policy entry that were staged. This step 1520 may include the user entering a response into the computer 102 or the telephone 118 via a keyboard associated with same, e.g., the keyboard 1826 shown in FIG. 18. The response may be to deny the proposed new learned relationship that was identified and proposed by the automated system for the call filtering program 110*a*, 110*b*, 110*c* if the user does not want to receive a phone call from the proposed entity. The response may be to approve a filter block if the proposal is regarding an entity from whom or which the user does not wish to receive a call. The response may be to adjust the proposed response, so that if the automated system proposed a block, the user may temper the entry policy response to be send to voicemail or to submit challenge questions to the caller.

For embodiments in which the automated learned relationship identification and updating of the filter program 110*a*, 110*b*, 110*c* incorporates a machine learning model, this user response or approval of step 1520 may be part of supervised learning for the machine learning model. The automated system and machine learning model may recognize when the user approves or denies their proposal and then may craft future proposals based off similar input data according to the previous approvals, rejections, or changes entered by the user in step 1520.

In an alternative learned relationship identification updating process, the automated system may automatically approve and implement a new entry and its recommended response actions for the entry into the learned relationship policy 1202. The user may always or at certain times prefer not to be interrupted by such proposals. The user may then choose to review new learned relationship entries and responses at a later time or in a batch mode, when many new entries may be reviewed at one time.

As a result of or as a part of step 1520, the relationship corpus 402 may be updated with entries for new learned relationships. The relationship policy 1202 may also be updated with entries for new learned relationships.

FIG. 16 shows an example of a relationship update process 1600 that may update manually defined and learned relationship entries to be used in the filtering processes shown in FIGS. 9, 11, and 2. FIG. 16 shows that the relationship update process 1600 may be a repeated loop in which updates are performed on a periodic basis.

In step 1602 of the relationship update process 1600, all active manually defined and learned relationships are retrieved. This retrieval may occur via a processor accessing and taking data from the relationship corpus 402, from the manually defined relationship policy 1002, and/or from the learned relationship policy 1202 that may be stored in the telephone 118 or remotely in the server 112. The entries for these relationships may include a status of active or inactive, e.g., expired.

In step 1604 of the relationship update process 1600, a determination is made as to whether the relationship expiration date/time has passed for the relationship entry. The processor may compare timestamp information from the time of determination and compare to the expiration date/time information indicated in the relationship corpus 402. If step 1604 is answered in the affirmative, then the relationship update process 1600 proceeds to step 1606. If step 1604 is answered in the negative, then the relationship update process 1600 proceeds to step 1610.

In step 1606 of the relationship update process 1600, the relationship status for the entry is changed to expired. The call filtering program 110*a*, 110*b*, 110*c* may perform text replacement to change the status in the relationship corpus 402 to be expired instead of active.

In step 1608 of the relationship update process 1600, the manually defined relationship policy 1002 or the learned relationship policy 1202 is updated to adjust for the expired relationship. The response for an entry may be changed to block instead of being to allow; however, if the respective policy is changed to a status of being inactive or expired the specific response policy may be irrelevant. If during the filtering the active relationships are retrieved but not the expired relationships, then the specific response policy for the expired relationships might not be checked.

In step 1610 of the relationship update process 1600, caller directories, entity APIs, or other services are queried for each active relationship in order to enrich relationship metadata. The call filtering program 110a, 110b, 110c may submit a query request to caller directories, entity APIs, or other services via a first or second communication network 116a, 116b and may receive a query response via the same networks. These recipient parties for the queries are external to the user device. For example, a website of a doctor may indicate a change in the office phone number.

In step 1612 of the relationship update process 1600, a determination is made as to whether new or updated caller ID metadata is found. The call filtering program 110a, 110b, 110c may perform a comparison of currently saved information with information received via the query to determine if any of the newly received information is new or updated. If step 1612 results in a negative determination, then the relationship update process 1600 may return to step 1602 for repeated update checks. If step 1612 results in an affirmative determination, then the relationship update process 1600 proceeds to step 1614.

In step 1614 of the relationship update process 1600, the relationship corpus 402 is updated with new caller ID metadata for each relationship. This update occurs for each piece of new or updated information from steps 1610 and 1612. The call filtering program 110a, 110b, 110c may automatically perform this updates of the information in the relationship corpus 402.

After step 1614, the relationship update process 1600 returns to step 1602 for repeated update checks via repeated iterations of the relationship update process 1600. Repeated performance of the relationship update process 1600 may be performed periodically at scheduled frequencies or may occur based on events that take place.

FIG. 17 shows an example of an external data source update process 1700 that may update locally cached data from external data sources. This external data source update process 1700 may be used in the filtering processes shown in FIGS. 13 and 2. FIG. 17 shows that the external data source update process 1700 may be a repeated loop which indicates that these updates may occur on a periodic basis to help improve the call filtering.

In step 1702 of the external data source update process 1700, all active external data source relationships are retrieved. The monitoring and update module may retrieve these relationships from the relationship corpus 402 that is stored in the telephone 118, in the computer 102, or in the server 112. The monitoring and update module may check a status for each external data source relationship. Such status may be indicated in the relationship corpus 402.

In step 1704 of the external data source update process 1700, a determination is made as to whether the relationship date/time has passed for the external data source relationship. The monitoring and update module may check an expiration date/time for each external data source relationship. Such status may be indicated in the relationship corpus 402 and/or in the external data source policy 1402. If the determination of step 1704 results in an affirmative answer, then the external data source update process 1700 may proceed to step 1706. If the determination of step 1704 results in a negative answer, then the external data source update process 1700 may proceed to step 1710.

In step 1706 of the external data source update process 1700, the relationship status is changed to expired. The call filtering program 110a, 110b, 110c may perform text replacement to change the status in the relationship corpus 402 to be expired instead of active.

In step 1708 of the external data source update process 1700, the external data source policy 1402 is updated to adjust for the expired relationship. The response for an entry may be changed to block instead of being to allow; however, if the respective policy is changed to a status of being inactive or expired the specific response policy may be irrelevant. If during the filtering the active relationships are retrieved but not the expired relationships, then the specific response policy for the expired relationships might not be checked.

In step 1710 of the external data source update process 1700, each active external data source is queried for updated data to cache locally. The call filtering program 110a, 110b, 110c may submit a query request to the external data sources via a first or second communication network 116a, 116b and may receive a query response via the same networks. These recipient parties for the queries are external to the user device. For those external data sources which do not permit local data storage, then steps 1710, 1712, and 1714 may be skipped.

In step 1712 of the external data source process 1700, a determination is made as to whether new or updated caller ID metadata is found. The call filtering program 110a, 110b, 110c may perform a comparison of currently saved information with information received via the query of step 1710 to determine if any of the newly received information is new or updated. If step 1712 results in a negative determination, then the external data source update process 1700 may return to step 1702 for repeated update checks. If step 1712 results in an affirmative determination, then the external data source update process 1700 proceeds to step 1714.

In step 1714 of the external data source update process 1700, the local cache is updated with new or updated caller ID metadata from steps 1710 and 1712. This update may occur to the relationship corpus 402 for each piece of new or updated called ID information from steps 1710 and 1712. The call filtering program 110a, 110b, 110c may automatically perform this updates of the information in the relationship corpus 402. The updates may include one or more updated lists of phone numbers associated with a small business.

After step 1714, the external data source update process 1700 returns to step 1702 for repeated update checks via repeated iterations of the external data source update process 1700. Repeated performance of the external data source update process 1700 may be performed periodically at scheduled frequencies or may occur based on events that take place.

FIGS. 16 and 17 included steps 1602 and 1702, respectively, of retrieving active relationships to monitor for potential updates. In an alternative embodiment, these updating processes may include retrieving expired relationships as an alternative or in addition to retrieving the active relationships. The filter user may wish to retrieve expired relationships to check for and obtain updates for outside parties with whom they once had a relationship. In this way, these expired relationships would have priority in the filtering process over new parties or new callers with whom the filter user has never had a relationship.

For steps in the various processes of this disclosure which include data matching, the data matching may include an exact match or a substantial match. A substantial match may occur if a name in the saved data has a name spelling different by one or a few letters from the name associated with the caller ID of the incoming call. The call filtering program 110a, 110b, 110c may still consider this substantial match to be sufficient to constitute matching for the processes.

It may be appreciated that FIGS. 2-17 provide only illustration of some embodiments and do not imply any limitations with regard to how different embodiments may be implemented. Many modifications to the depicted embodiment(s), e.g., to a depicted sequence of steps, may be made based on design and implementation requirements.

Figure 18:
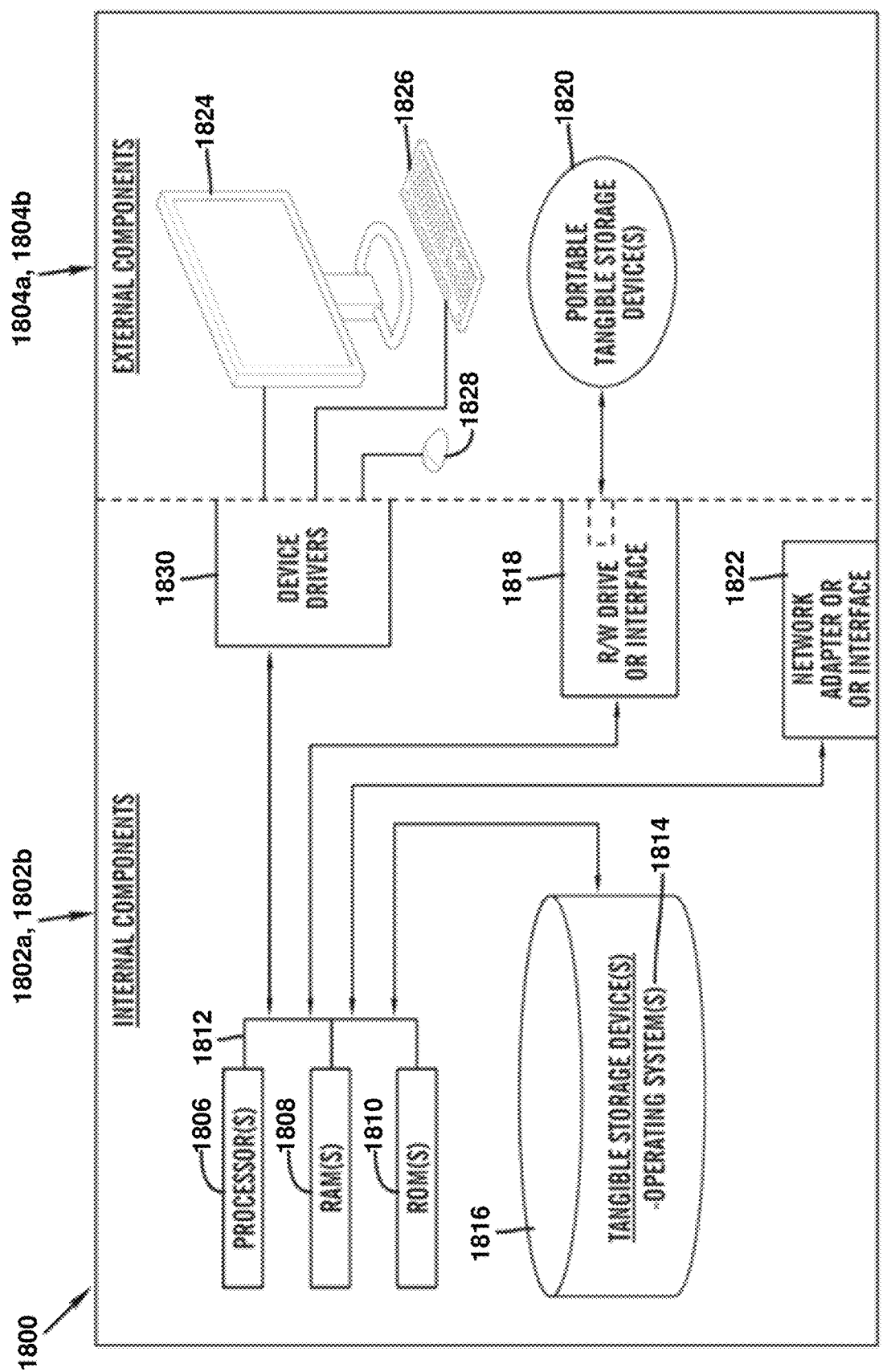
FIG. 18 is a block diagram of internal and external components of computers, phones, and servers depicted in FIG. 1 according to at least one embodiment.

FIG. 18 is a block diagram 1800 of internal and external components of computers depicted in FIG. 1 in accordance with an illustrative embodiment of the present invention. It should be appreciated that FIG. 18 provides only an illustration of one implementation and does not imply any limitations with regard to the environments in which different embodiments may be implemented. Many modifications to the depicted environments may be made based on design and implementation requirements.

Data processing system 1802a, 1802b, 1804a, 1804b is representative of any electronic device capable of executing machine-readable program instructions. Data processing system 1802a, 1802b, 1804a, 1804b may be representative of a smart phone, a computer system, PDA, or other electronic devices. Examples of computing systems, environments, and/or configurations that may represented by data processing system 1802a, 1802b, 1804a, 1804b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102, telephone 118, and server 112 may include respective sets of internal components 1802a, 1802b and external components 1804a, 1804b illustrated in FIG. 18. Each of the sets of internal components 1802a, 1802b includes one or more processors 1806, one or more computer-readable RAMs 1808 and one or more computer-readable ROMs 1810 on one or more buses 1812, and one or more operating systems 1814 and one or more computer-readable tangible storage devices 1816. The one or more operating systems 1814, the software program 108a, and the call filtering program 110a in client computer 102, the software program 108b and the call filtering program 110b in telephone 118, and the call filtering program 110c in server 112, may be stored on one or more computer-readable tangible storage devices 1816 for execution by one or more processors 1806 via one or more RAMs 1808 (which typically include cache memory). In the embodiment illustrated in FIG. 18, each of the computer-readable tangible storage devices 1816 is a magnetic disk storage device of an internal hard drive. Alternatively, each of the computer-readable tangible storage devices 1816 is a semiconductor storage device such as ROM 1810, EPROM, flash memory, or any other computer-readable tangible storage device that can store a computer program and digital information.

Each set of internal components 1802a, 1802b also includes a R/W drive or interface 1818 to read from and write to one or more portable computer-readable tangible storage devices 1820 such as a CD-ROM, DVD, memory stick, magnetic tape, magnetic disk, optical disk or semiconductor storage device. A software program, such as the software program 108a, 108b and the call filtering program 110a, 110b, 110c can be stored on one or more of the respective portable computer-readable tangible storage devices 1820, read via the respective R/W drive or interface 1818 and loaded into the respective hard drive 1816.

Each set of internal components 1802a, 1802b may also include network adapters (or switch port cards) or interfaces 1822 such as a TCP/IP adapter cards, wireless wi-fi interface cards, or 3G or 4G wireless interface cards or other wired or wireless communication links. The software program 108a and the call filtering program 110a in client computer 102, the software program 108b and the call filtering program 110b in the telephone 118, and the call filtering program 110c in server 112 can be downloaded from an external computer (e.g., server) via a network (for example, the Internet, a local area network or other, wide area network) and respective network adapters or interfaces 1822. From the network adapters (or switch port adaptors) or interfaces 1822, the software program 108a, 108b and the call filtering program 110a in client computer 102 and the call filtering program 110b in server 112 are loaded into the respective hard drive 1816. The network may include copper wires, optical fibers, wireless transmission, routers, firewalls, switches, gateway computers and/or edge servers.

Each of the sets of external components 1804a, 1804b can include a computer display monitor 1824, a keyboard 1826, and a computer mouse 1828. External components 1804a, 1804b can also include touch screens, virtual keyboards, touch pads, pointing devices, and other human interface devices. Each of the sets of internal components 1802a, 1802b also includes device drivers 1830 to interface to computer display monitor 1824, keyboard 1826 and computer mouse 1828. The device drivers 1830, R/W drive or interface 1818 and network adapter or interface 1822 include hardware and software (stored in storage device 1816 and/or ROM 1810).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 19:
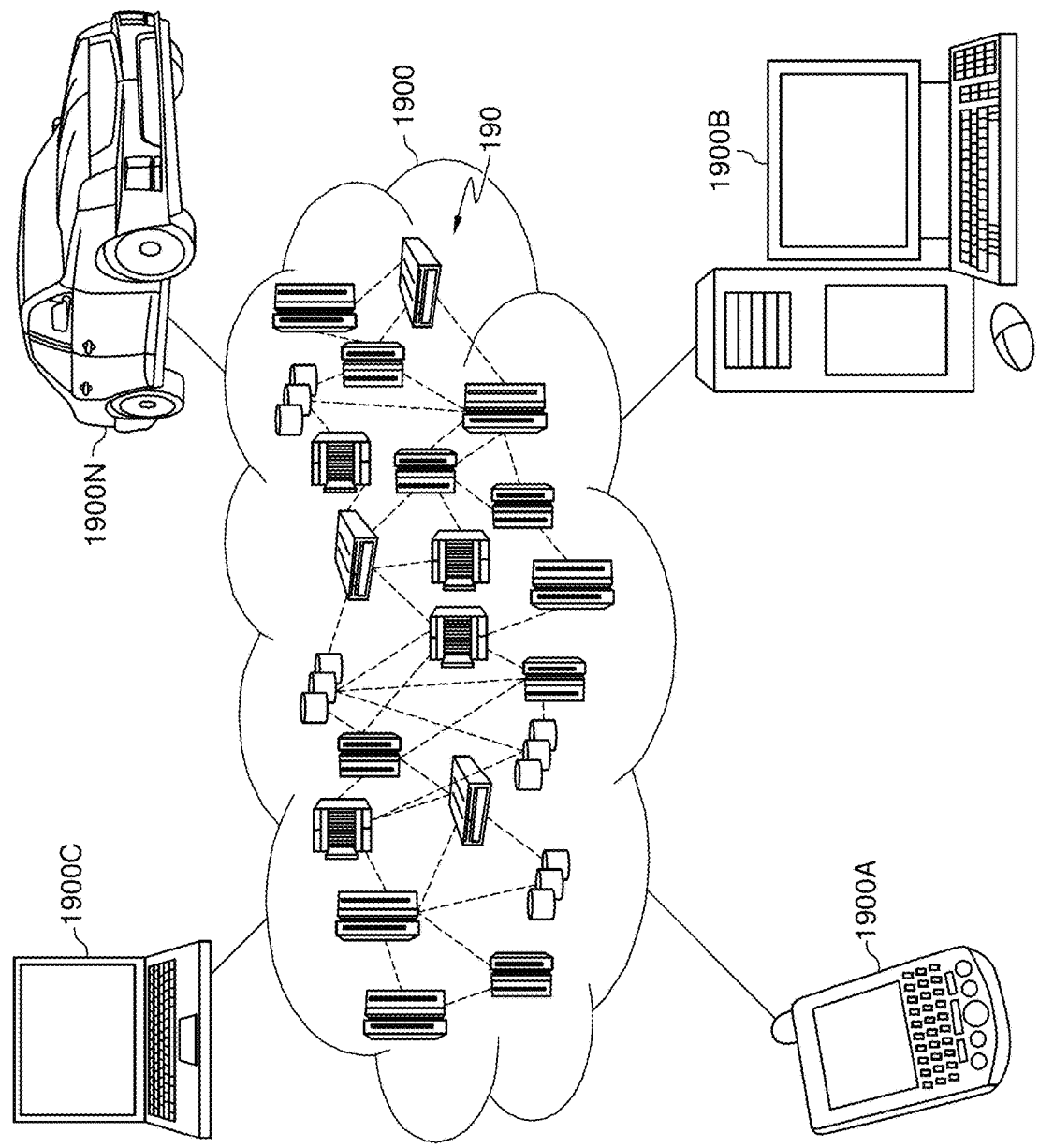
FIG. 19 is a block diagram of an illustrative cloud computing environment including the computer system depicted in FIG. 1, in accordance with an embodiment of the present disclosure.

Referring now to FIG. 19, illustrative cloud computing environment 1900 is depicted. As shown, cloud computing environment 1900 comprises one or more cloud computing nodes 190 with which local computing devices used by cloud consumers, such as, for example, personal digital assistant (PDA) or cellular telephone 1900A, desktop computer 1900B, laptop computer 1900C, and/or automobile computer system 1900N may communicate. Nodes 190 may communicate with one another. They may be grouped (not shown) physically or virtually, in one or more networks, such as Private, Community, Public, or Hybrid clouds as described hereinabove, or a combination thereof. This allows cloud computing environment 1900 to offer infrastructure, platforms and/or software as services for which a cloud consumer does not need to maintain resources on a local computing device. It is understood that the types of computing devices 1900A-N shown in FIG. 19 are intended to be illustrative only and that computing nodes 190 and cloud computing environment 1900 can communicate with any type of computerized device over any type of network and/or network addressable connection (e.g., using a web browser).

Figure 20:
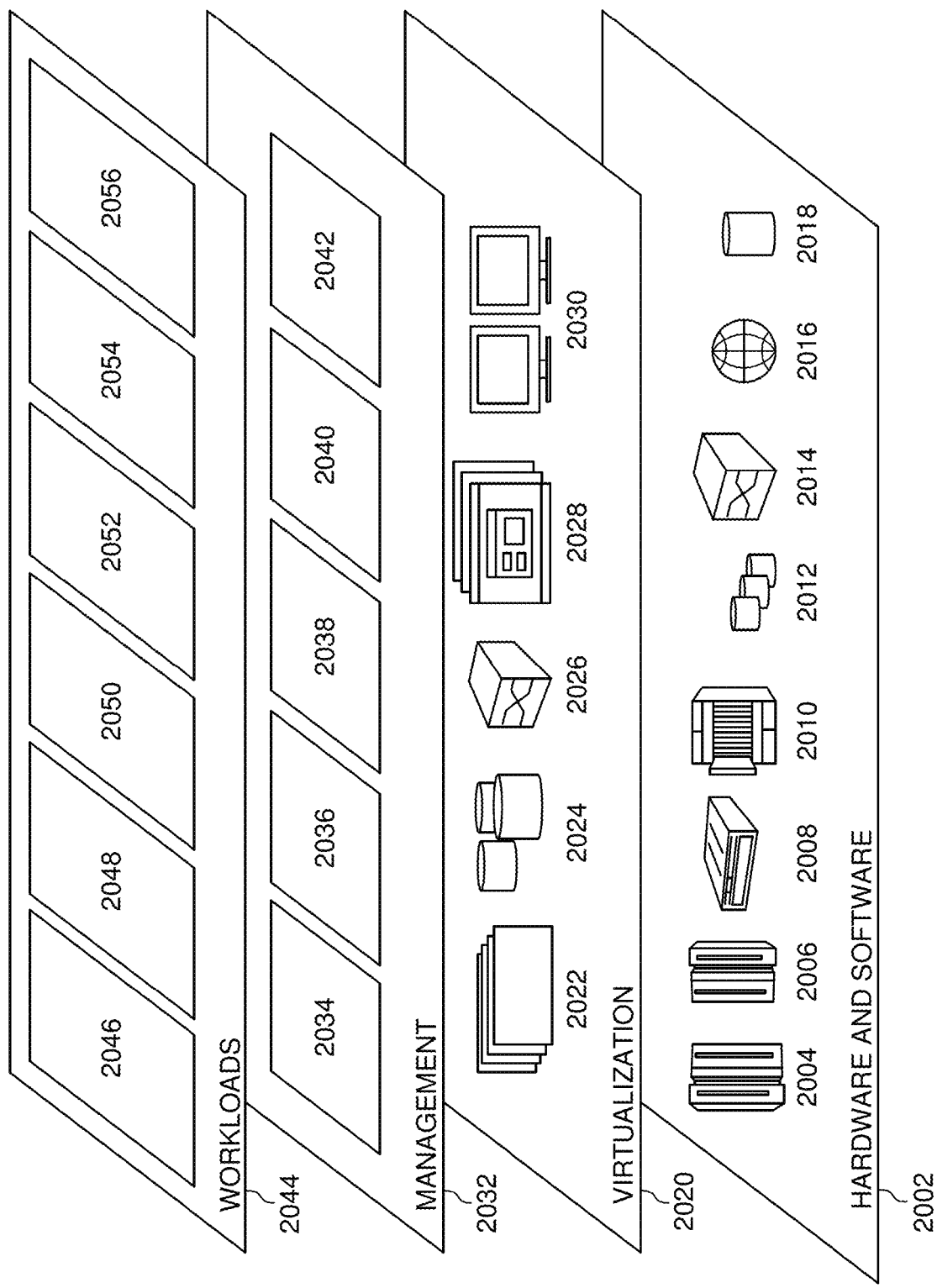
FIG. 20 is a block diagram of functional layers of the illustrative cloud computing environment of FIG. 19, in accordance with an embodiment of the present disclosure.

Referring now to FIG. 20, a set of functional abstraction layers 2000 provided by cloud computing environment 1900 is shown. It should be understood in advance that the components, layers, and functions shown in FIG. 20 are intended to be illustrative only and embodiments of the invention are not limited thereto. As depicted, the following layers and corresponding functions re provided:

Hardware and software layer 2002 includes hardware and software components. Examples of hardware components include: mainframes 2004; RISC (Reduced Instruction Set Computer) architecture based servers 2006; servers 2008; blade servers 2010; storage devices 2012; and networks and networking components 2014. In some embodiments, software components include network application server software 2016 and database software 2018.

Virtualization layer 2020 provides an abstraction layer from which the following examples of virtual entities may be provided: virtual servers 2022; virtual storage 2024; virtual networks 2026, including virtual private networks; virtual applications and operating systems 2028; and virtual clients 2030.

In one example, management layer 2032 may provide the functions described below. Resource provisioning 2034 provides dynamic procurement of computing resources and other resources that are utilized to perform tasks within the cloud computing environment. Metering and Pricing 2036 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 2038 provides access to the cloud computing environment for consumers and system administrators. Service level management 2040 provides cloud computing resource allocation and management such that required service levels are met. Service Level Agreement (SLA) planning and fulfillment 2042 provide pre-arrangement for, and procurement of, cloud computing resources for which a future requirement is anticipated in accordance with an SLA.

Workloads layer 2044 provides examples of functionality for which the cloud computing environment may be utilized.

Examples of workloads and functions which may be provided from this layer include: mapping and navigation 2046; software development and lifecycle management 2048; virtual classroom education delivery 2050; data analytics processing 2052; transaction processing 2054; and call filtering 2056. Call filtering program 110a, 110b, 110c that may be implemented in the layer of call filtering 2056 provides a way to improve phone call filtering by incorporating monitoring of app usage on the user device to better identify potential callers whose call should be accepted.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for filtering a phone call, the method comprising:
    detecting an incoming phone call to a phone;
    receiving call metadata from the incoming phone call;
    comparing the call metadata to entries of a learned relationship filter, wherein the entries of the learned relationship filter are obtained by monitoring:
        behavior of a phone user on the phone during previous calls to the phone, and
        application usage on the phone, the application usage comprising downloading and usage of multiple applications on the phone,
    so that learned relationships to the phone user including relationships with parties for the downloaded multiple applications are identified and saved, wherein the learned relationship filter provides a filtering response; and
        performing the filtering response to the incoming phone call.

2. The method of claim 1, wherein the phone is a mobile phone and the application usage is on the mobile phone.

3. The method of claim 1, wherein the application usage that is monitored further comprises web browsing performed by the phone user on the phone.

4. The method of claim 1, wherein the application usage that is monitored further comprises text-based communication that occurs via the phone.

5. The method of claim 1, wherein the learned relationship filter comprises a machine learning model;
    wherein observations from the monitoring are input into the machine learning model; and
    wherein the entries for the learned relationship filter are outputs of the machine learning model.

6. The method of claim 3, wherein a first entry of the learned relationship filter comprises an expiration time and was based on the monitoring of the application usage;
    wherein after the expiration time the filtering response for the first entry is adjusted in the learned relationship filter; and
    wherein the expiration time is selected based on a nature of an interaction of the user with the application during the web browsing.

7. The method of claim 1, wherein a response policy for a first entry of the learned relationship filter comprises an expiration time for a particular policy,
    wherein the learned relationship filter enters in the expiration time for the first entry based on a specified duration after completion of a first event; and
    wherein a reservation for the first event was identified during the monitoring of the application usage.

8. The method of claim 1, further comprising comparing the call metadata to further entries of at least one of a manually defined relationship filter and an external data source filter.

9. The method of claim 1, wherein the monitoring of the application usage further comprises monitoring whether the user has authenticated with the downloaded multiple applications.

10. The method of claim 1, wherein the monitoring of the application usage further comprises monitoring web browsing interaction of the user to a website belonging to a first entity so that a learned relationship for the learned relationship filter is generated for the first entity.

11. The method of claim 1, wherein the monitoring of the application usage further comprises monitoring frequency of a web browsing interaction of the user to a website belonging to a first entity so that a learned relationship for the learned relationship filter is generated for the first entity based on the monitored frequency exceeding a predetermined threshold.

12. A computer system for filtering a phone call, the computer system comprising:
    one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
        detecting an incoming phone call to a phone;
        receiving call metadata from the incoming phone call;
        comparing the call metadata to entries of a learned relationship filter, wherein the entries of the learned relationship filter are obtained by monitoring:
            behavior of a phone user on the phone during previous calls to the phone, and
            application usage on the phone, the application usage comprising downloading and usage of multiple applications on the phone,
    so that learned relationships to the phone user including relationships with parties for the downloaded multiple applications are identified and saved, wherein the learned relationship filter provides a filtering response; and
        performing the filtering response to the incoming phone call.

13. The computer system of claim 12, wherein the application usage that is monitored further comprises web browsing performed by the user on the phone.

14. The computer system of claim 12, wherein the application usage that is monitored further comprises text-based communication that occurs via the phone.

15. The computer system of claim 12, wherein the learned relationship filter comprises a machine learning model;
wherein observations from the monitoring are input into the machine learning model; and
wherein the entries for the learned relationship filter are outputs of the machine learning model.

16. The computer system of claim 13, wherein a first entry of the learned relationship filter comprises an expiration time and is based on the monitoring of the application usage;
wherein after the expiration time the filtering response for the first entry is adjusted in the learned relationship filter; and
wherein the expiration time is selected based on a nature of an interaction of the user with the application during the web browsing.

17. The computer system of claim 12, wherein a response policy for a first entry of the learned relationship filter comprises an expiration time for a particular policy;
wherein the learned relationship filter enters in the expiration time for the first entry based on a specified duration after completion of a first event; and
wherein a reservation for the first event was identified during the monitoring of the application usage.

18. A computer program product for filtering a phone call, the computer program product comprising a computer-readable storage medium having program instructions embodied therewith, wherein the program instructions are executable by a computer system to cause the computer system to perform a method comprising:
detecting an incoming phone call to a phone;
receiving call metadata from the incoming phone call;
comparing the call metadata to entries of a learned relationship filter, wherein the entries of the learned relationship filter are obtained by monitoring:
behavior of a phone user on the phone during previous calls to the phone, and
application usage on the phone, the application usage comprising downloading and usage of multiple applications on the phone,
so that learned relationships to the phone user including relationships with parties for the downloaded multiple applications are identified and saved, wherein the learned relationship filter provides a filtering response; and
performing the filtering response to the incoming phone call.

19. The computer program product of claim 18, wherein the application usage that is monitored further comprises web browsing performed by the user on the phone.

20. The computer program product of claim 18, wherein the learned relationship filter is obtained further by monitoring text-based communication that occurs via the phone.

* * * * *